(12) United States Patent
Niwa

(10) Patent No.: US 7,421,396 B2
(45) Date of Patent: Sep. 2, 2008

(54) TRAVEL INFORMATION DISTRIBUTION SYSTEM

(75) Inventor: Yushi Niwa, Tokyo (JP)

(73) Assignee: NEC Corporation, Tokyo (JP)

( * ) Notice: Subject to any disclaimer, the term of this patent is extended or adjusted under 35 U.S.C. 154(b) by 1064 days.

(21) Appl. No.: 09/832,926

(22) Filed: Apr. 12, 2001

(65) Prior Publication Data

US 2001/0034624 A1 Oct. 25, 2001

(30) Foreign Application Priority Data

Apr. 13, 2000 (JP) ............................. 2000-112177

(51) Int. Cl.
*G06Q 10/00* (2006.01)
(52) U.S. Cl. ............................................. 705/1; 705/6
(58) Field of Classification Search ...................... 705/1
See application file for complete search history.

(56) References Cited

U.S. PATENT DOCUMENTS

| 5,790,974 | A | | 8/1998 | Tognazzini |
| 5,948,040 | A | * | 9/1999 | DeLorme et al. ............ 701/201 |
| 5,966,068 | A | | 10/1999 | Wicks et al. |
| 6,119,095 | A | | 9/2000 | Morita |
| 6,336,072 | B1 | * | 1/2002 | Takayama et al. ........... 701/200 |
| 6,639,550 | B2 | * | 10/2003 | Knockeart et al. ..... 342/357.13 |

FOREIGN PATENT DOCUMENTS

| CN | 1164072 | 11/1997 |
| EP | 0 795 835 A1 | 7/1997 |
| JP | 9-36798 | 2/1997 |
| JP | 10-185609 | 7/1998 |
| JP | 11-134407 | 5/1999 |
| JP | 11-143358 | 5/1999 |
| JP | 2000-28391 | 1/2000 |

OTHER PUBLICATIONS

Proquest article Centerseat Galileo International Agreement Revolutionizes Interactive Entertainment, Online Travel. New York Dec. 14, 1999/ p. 1 PR Newswire.*
Seishi Tsukada et al., "Mocha: Mobility-Oriented Contents Hosting Architecture Concept, Structure and Service", 1998, pp. 63-70.

(Continued)

*Primary Examiner*—John G. Weiss
*Assistant Examiner*—Traci Casler
(74) *Attorney, Agent, or Firm*—Foley & Lardner LLP

(57) ABSTRACT

A travel information distribution system includes a distribution center and a wireless terminal of a user who can readily obtaining necessary travel information in traveling places using the wireless terminal such a portable telephone or a portable personal computer. The user visits a travel agency to apply a travel, has a travel schedule table prepared and registers a telephone number of the wireless terminal in a database. The travel agency sends the data of the user to the distribution center, and distribution center receives travel information from information providers. After the departure of the travel, the distribution center transmits necessary travel information to the user at a proper time in a proper place. The user can obtain the necessary updated information in the necessary place and can be free from a heavy weight travel guidebooks. The distribution center can obtain advertisement incomes from travel agencies and advertisement firms.

24 Claims, 23 Drawing Sheets

OTHER PUBLICATIONS

Keiko Kumagai et al., "Mocha: Mobility-Oriented Contents Hosting Architecture Concept, Structure and Service for Mobile User", 1999, pp. 383-390.

Makoto Shioya et al., "ITS Service Platform Connecting Mobile Users to Information Based World", 2000, pp. 17-20.

Toshiaki Saeki et al., "Map Distribution System Based on Real-Time and Reliable QoS Control", pp. 53-58 (Mitsubishi Electric Corporation).

* cited by examiner

F I G. 2

121 DISTRIBUTION INFORMATION STORAGE AREA

| 122 TRAVEL CODE NUMBER | | NAME OF INFORMATION | DISTRIBUTION TIMING | CONTENT |
|---|---|---|---|---|
| Axxx | 123 FIRST INFORMATION SECTION — UNCHANGEABLE INFORMATION DETERMINED BEFORE DEPARTURE | TRAVEL PLAN TABLE | BEFORE DEPARTURE, SCHEDULE CHANGE TIME | ELECTRONIC TRAVEL SCHEDULE TABLE ITSELF. |
| | | 125 — EXPLANATION OF SIGHT SEEING PLACES | BEFORE ARRIVAL TO SIGHT SEEING PLACE | EXPLANATION OF SCHEDULED SIGHT SEEING PLACES. |
| | | 126 — PHONE TO LODGING HOTEL | AFTER DEPARTURE UNTIL ARRIVAL | SOFTWARE SWITCH DIRECT PHONE TO LODGING HOTEL. |
| | | 127 — PHONE TO TOUR CONDUCTOR | UNTIL DEPARTURE | SOFTWARE SWITCH DIRECT PHONE TO TERMINAL FOR TOUR CONDUCTOR. |
| | | 128 — MAPS | JUST BEFORE ARRIVAL TO STOPPING PLACE | SKETCH MAP OF STOPPING PLACE (STATION, DRIVE-IN AND SO ON), MARK PLACE OF TOILET, MEETING PLACE. |
| | | TOWN INFORMATION (GUIDE) | JUST BEFORE ARRIVAL TO STOPPING PLACE | SIGHT SEEING MAP, SHOPPING MAP, LOCATION OF LODGING HOTEL. |
| | | EVENTS INFORMATION | AFTER APPLICATION, ANY TIME | EVENTS, FESTIVAL INFORMATION, TIME SALE. |
| | | TIE-UP GIFT SHOPS INFORMATION | BEFORE ARRIVAL TO SHOP (SIGHT SEEING PLACE) | ADVERTISEMENT OF GIFT SHOPS. INTRODUCTION OF RECOMMENDED GOODS. |
| | | GIFT ORDER FORM | BEFORE ARRIVAL TO SHOP | NOT FORGET GIFT SHOPPING IN TIE-UP GIFT SHOPS. |
| | | TIMETABLE & FARE TABLE OF PUBLIC TRANSPORT | BEFORE USE OF CONCERNED TRANSPORT | SCHEDULED USE OF RAILWAY LINES, TIMETABLE & FARE TABLE. AVAILABLE WHEN ACCIDENT HAPPENS. |
| | | SEAT NUMBERS OF BUS & TRAIN | UNTIL JUST BEFORE GET IN | SEAT NUMBERS & SKETCH MAP. |
| | 124 SECOND INFORMATION SECTION — CHANGEABLE INFORMATION GRADUALLY DETERMINED AFTER DEPARTURE | ROOM ALLOCATION OF HOTELS & INNS | UNTIL JUST BEFORE ARRIVAL TO HOTEL | ROOM NUMBER ALLOCATION OF HOTEL. |
| | | TONIGHT'S MENU | AFTER DEPARTURE, UNTIL BEFORE LUNCH | MENU IN CASE OF DINNER IN HOTEL. CAN DETERMINE LUNCH MENU WITH THIS CONTENTS. |
| | | WEATHER & TEMPERATURE IN ACTUAL PLACES | UNTIL THE DAY BEFORE DEPARTURE | FORECAST WEATHER & TEMPERATURE IN EACH SIGHT SEEING PLACE, EACH STAYING PLACE. |
| | | REGULATIONS INFORMATION | AS SOON AS YOU KNOW ANY TIME | TRAFFIC REGULATIONS INFORMATION IN EACH SIGHT SEEING PLACE, EACH STAYING PLACE. |

FIG. 4

| | | | | |
|---|---|---|---|---|
| APRIL 6, 2000 | MEETING; 22:30 | UENO STATION DEPART AT 22:50 | LIMITED EXPRESS HOKURIKU NO.7 ▬▬▬▬ | SLEEP IN TRAIN |
| APRIL 7, 2000 | ▬▬ ARRIVE AT STATION 6:00 | TOYAMA STATION 6:15 | BUS 7:20 | NANAO HOT SPRING BREAKFAST 8:10 | BUS 10:00 | WAJIMA HOTEL STAY |
| APRIL 8, 2000 | WAJIMA HOTEL BREAKFAST 7:00 | WAJIMA HOTEL BREAKFAST 8:10 | BUS ⇝ | | |
| -------- | | | | |

141

174 PERSONAL SCHEDULE TABLE

PERSONAL SCHEDULE TABLE 231

| TRAVEL AGENCY IDENTIFIER | JPN03996BN332 |
|---|---|
| TRAVELER IDENTIFIER | M4511A-0826 |
| WIRELESS TERMINAL COMMUNICATION ADDRESS | 09012345678@mobile.tel.ne.jp |
| TRAVEL SCHEDULE TABLE POINTER | A10-523343-YN |

F I G. 8

TRAVEL SCHEDULE TABLE 232

| # | DATE | TIME | PLACE | KIND | PREVIOUS ACTION | TOLERANCE | FACTOR | STORAGE PLACE (LOCAL) | FINISH |
|---|---|---|---|---|---|---|---|---|---|
| 1 | APRIL 7, 2000 | 06:00 | TOYAMA STATION (T00231) | STATION MAP (S-MAP) | TRAIN MOVING (TRAIN) | 00:05 | 1.0 | /local/db/map001.dat | "1" |
| 2 | APRIL 7, 2000 | 07:20 | NANAO HOT SPRING (T01551) | BREAKFAST (M-MNU) | BUS MOVING (BUS) | 00:10 | 1.0 |  | "0" |
| 3 | APRIL 7, 2000 | 07:20 | NANAO HOT SPRING (T01551) | GIFT (SHOP) | BUS MOVING (BUS) | 00:10 | 1.0 | /local/db/Shop05.dat | "0" |
|  |  |  |  |  |  |  |  |  |  |

FIG. 9

175 TOLERANCE TABLE

| PREVIOUS ACTION | REFERENCE TOLERANCE |
|---|---|
| TRAIN MOVING(TRAIN) | 00:05 |
| BUS MOVING(BUS) | 00:10 |
| DOMESTIC AIRPLANE MOVING(D-PLANE) | 00:20 |
| INTERNATIONAL AIRPLANE MOVING(I-PLANE) | 01:00 |
| GROUP HOTEL DEPARTURE | 00:15 |
| PERSONAL HOTEL DEPARTURE | 00:30 |
| ---------- | ---------- |

FIG. 10

176 FACTOR TABLE

| DATE | FACTOR |
|---|---|
| ---------- | ---------- |
| APRIL 4, 2000 | 1.1 |
| APRIL 5, 2000 | 2.0 |
| APRIL 6, 2000 | 2.0 |
| APRIL 7, 2000 | 1.0 |
| APRIL 8, 2000 | 1.0 |
| ---------- | ---------- |

FIG. 11

181 INFORMATION ADDRESS TABLE

| INFORMATION ITEM | ACCESS MEANS | INFORMATION SOURCE POINTER |
|---|---|---|
| JR HIGASHISHINNJO STATION TIMETABLE | WWW | http://www.jr-e.co.jp/timetable/shin.. |
| JR TOYAMA STATION PRECINCTS MAP | WWW | http://www.toyama.go.jp/kanko/map/to.. |
| JR TOYAMA STATION TIMETABLE | WWW | http://www.jr-e.co.jp/timetable/toya.. |
| ...... | ...... | ...... |
| NANAO HOT SPRING DRIVE-IN BREAKFAST | FAX | 012-345-6789#12 |
| NANAO HOT SPRING INNS ROOM VACANCY SITUATION | WWW | http://www.toyama.go.jp/onsen/nanao/.. |
| ...... | ...... | ...... |

F I G. 12

151 DISTRIBUTION SCHEDULE TABLE

| DATE | TIME | TRAVEL SCHEDULE TABLE POINTER | # |
|---|---|---|---|
| APRIL 7,2000 | 05:30 | B09-887599-KA | 9 |
| APRIL 7,2000 | 05:55 | A10-523343-YN | 1 |
| APRIL 7,2000 | 05:55 | A10-523344-AN | 1 |
| APRIL 7,2000 | 05:55 | A10-523345-II | 1 |
| APRIL 7,2000 | 07:10 | A10-523343-YN | 2 |
| ----------- | -------- | | |

F I G. 18
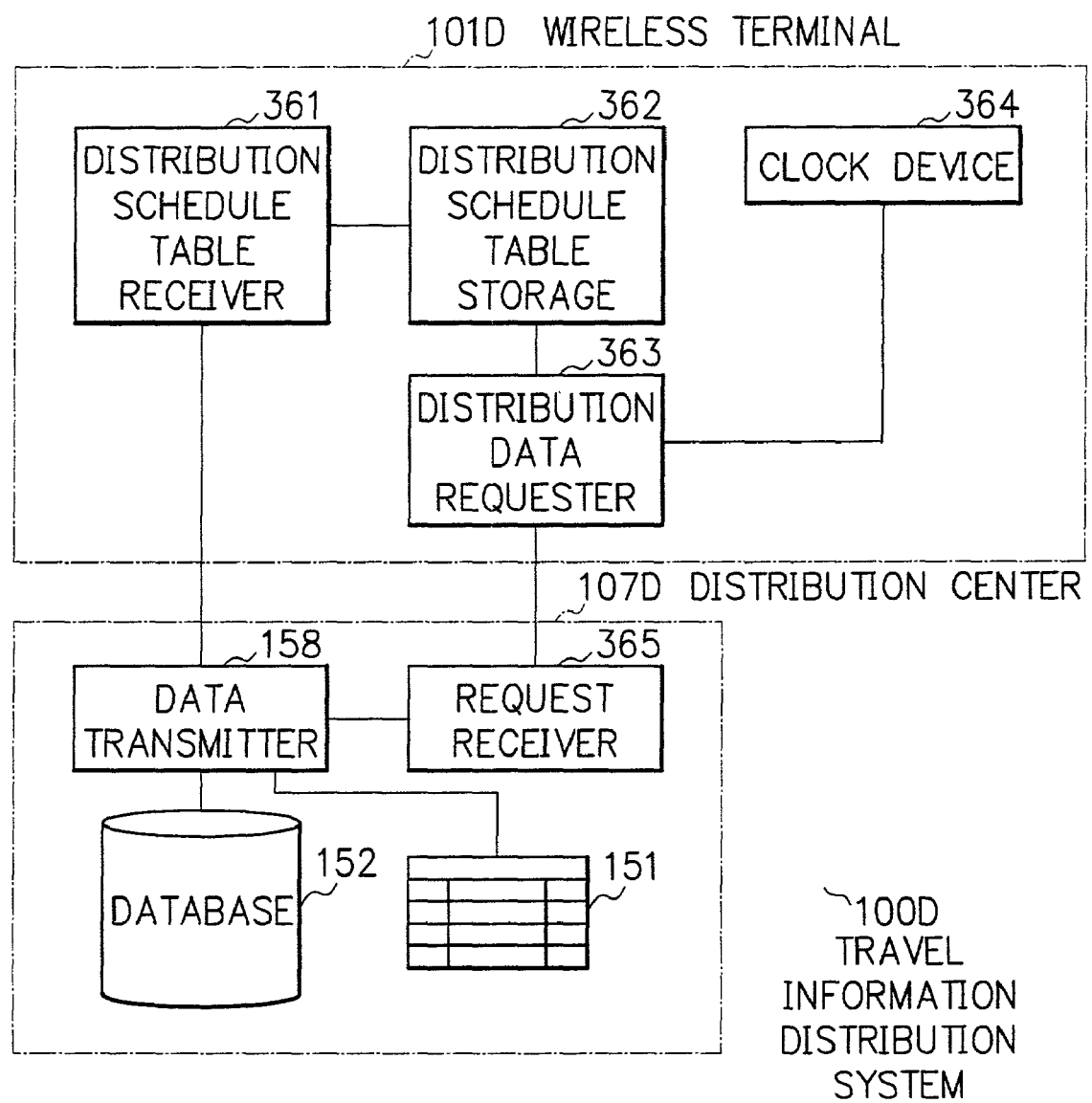

FIG. 20

| TIME BAND | FACTOR |
|---|---|
| ---------------- | -------- |
| 06:00-07:00 | 1.5 |
| 07:00-8:30 | 1.8 |
| 08:30-09:30 | 3.0 |
| 09:30-11:00 | 2.2 |
| 11:00-13:00 | 1.3 |
| ---------------- | -------- |

391

175G TOLERANCE TABLE

| PLACE | LONGITUDE & LATITUDE | TOLERANCE |
|---|---|---|
| TOYAMA STATION (T00231) | E137.12.58.5 N36.41.54.0 | 0.0.1 |
| NANAO HOT SPRING (T01551) | E136.57.1.7 N37.2.19.3 | 0.0.5 |
| NANAO HOT SPRING (T01551) | E136.57.1.7 N37.2.19.3 | 0.0.5 |
| --------- | ------------ | --------- |

FIG. 24

151G DISTRIBUTION SCHEDULE TABLE

| # | DATE | TIME | PLACE | LONGITUDE & LATITUDE | TOLERANCE | STORAGE PLACE (LOCAL) | KIND | FINISH |
|---|---|---|---|---|---|---|---|---|
| 1 | APRIL 7, 2000 | 06:00 | TOYAMA STATION (T00231) | E137.12.58.5 N36.41.54.0 | 0.0.1 | /local/db/map001.dat | STATION MAP (S-MAP) | "1" |
| 2 | APRIL 7, 2000 | 07:20 | NANAO HOT SPRING (T01551) | E136.57.1.7 N37.2.19.3 | 0.0.5 | | BREAKFAST (M-MNU) | "0" |
| 3 | APRIL 7, 2000 | 07:20 | NANAO HOT SPRING (T01551) | E136.57.1.7 N37.2.19.3 | 0.0.5 | /local/db/Shop05.dat | GIFT (SHOP) | "0" |
| ... | ... | ... | ... | ... | ... | ... | ... | ... |

TRAVEL INFORMATION DISTRIBUTION SYSTEM

BACKGROUND OF THE INVENTION

The present invention relates to a travel information distribution system for receiving distribution of information required in domestic and foreign places when traveling in domestic and foreign countries.

DESCRIPTION OF THE RELATED ART

Nowadays, it becomes quite usual that people travel in a domestic or foreign country by a single person or a small number of persons without accompanied by a tour conductor or a guide. Such a travel without accompanied by the tour conductor or the guide can be freely scheduled, but it is necessary for the travelers to obtain travel information such as maps of traveling places, public transport, sleeping accommodations and so on by themselves in some ways. Accordingly, it is necessary to prepare all information along a traveling route along with papers such as travel guidebooks and pamphlets in advance or to obtain the information in the actual traveling places.

In the former way, updated travel guidebooks are necessarily bought for obtaining fresh and up-to-date information and burdens not only a further cost but also a heavy weight when carrying in the traveling. In the latter way, new information in the actual traveling places can be obtained as merits, but if there is not enough time to spare, necessary information cannot be obtained. Further, in foreign countries languages become an obstacle and the obtained information cannot be effectively utilized.

In recent years, a traveler has tried to carry a wireless terminal such as a portable computer, a portable telephone or the like in a traveling and to connect to a network such as Internet for collecting the information. However, when the portable computer is connected to the network using a modem, it is difficult to find such equipment except in a first class hotel when going abroad and is further not easy to access to an information source.

When the portable wireless telephone capable of connecting to the network such as the Internet is used, the portable wireless telephone can access to the information source in a wireless manner and there is no problem in this matter. However, it takes considerable time for retrieving the desired information after connecting to the network such as the Internet, and enough information cannot be often obtained even when the retrieval is possible. Further, generally, it requires considerable time to operate the portable telephone for pressing the information in the retrieval, and thus this is not a practical method for many people. That is, the target place or the place the traveler wants to check up may be passing while it takes long time to carry out the retrieval or the operation, or the delay in a schedule such as missing the train due to the operation for obtaining the information may occur.

SUMMARY OF THE INVENTION

It is therefore an object of the present invention to provide a travel information distribution system in view of the aforementioned problems of the prior art, which is capable of readily obtaining proper information using a wireless terminal in actual traveling places.

In accordance with one aspect of the present invention, there is provided a travel information distribution system comprising: a schedule table preparator for preparing a schedule table containing reference places for obtaining information in a traveling, arrival dates and times of the reference places and distribution data to be distributed to a wireless terminal of a user in the reference places from an itinerary table of a travel; and a data distributor for searching the arrival dates and times in order from the schedule table prepared by the schedule table preparator to distribute distribution data to the wireless terminal of the user in respective arrival dates and times via a network.

As described above, in the travel information distribution system according to the present invention, the schedule table containing the reference places for obtaining the necessary information in the traveling, the arrival dates and times to the reference places and the distribution data to be distributed to the wireless terminal of the user in the reference places is prepared on the basis of the itinerary table of the travel, and the arrival dates and times are searched in order from the prepared schedule table to distribute distribution data to the wireless terminal of the user on respective arrival dates and times via a network. Hence, the necessary information can be distributed to the user via the network on every arrival to the reference plate. Therefore, the user carrying the wireless terminal can always receive the distribution of the updated information in the reference places, and can be available further information such as weather information, a political situation and the like. Hence, the traveler need not carry travel guidebooks and a radio set or a small television set for receiving news, and can reduce the weight of carrying bags.

Further, the traveler need not any guide for historic spots and places and can realize an economical low cost travel. A distribution center for distributing distribution data such as travel information and so on can collect advertisement incomes from travel agencies and travel advertisement firms to able to make a commercial profit in business and thus can always obtain and distribute fresh information to the user. The traveler can also receive the updated and useful information. Further, the distribution data is transmitted to the traveler at a predetermined time, and the traveler can check whether or not the own travel is kept on schedule by observing the timing of the distribution data.

In accordance with another aspect of the present invention, there is provided a travel information distribution system comprising: a travel information distribution system comprising: a schedule table preparator for preparing a schedule table containing reference places for obtaining information in a traveling, arrival dates and times of the reference places and distribution data to be distributed to a wireless terminal of a user in the reference places from an itinerary table of a travel; a tolerance calculator for calculating time differences with respect to the arrival dates and times written in the schedule table prepared by the schedule table preparator; an arrival date corrector for correcting the arrival dates and times to earliest ones on the basis of the differences calculated by the tolerance calculator; and a data distributor for searching the arrival dates and times in order from the prepared schedule table to distribute distribution data related to the arrival dates and times corrected by the arrival date corrector to the wireless terminal of the user in respective arrival dates and times via a network.

In the travel information distribution system of the present invention, the schedule table containing the reference places for obtaining the necessary information in the traveling, the arrival dates and times to the reference places and the distribution data to be distributed to the wireless terminal of the user in the reference places is prepared on the basis of the itinerary table of the travel, and the arrival dates and times are searched in order from the prepared schedule table to distribute distribution data to the wireless terminal of the user on respective arrival dates and times via a network.

Hence, the necessary information can be distributed to the user via the network on every arrival to the reference plate. Therefore, the user carrying the wireless terminal can always receive the distribution of the updated information in the reference places, and can be available further information such as weather information, a political situation and the like. Hence, the traveler need not carry travel guidebooks and a radio set or a small television set for receiving news, and can reduce the weight of carrying bags. Further, the traveler need not any guide for historic spots and places and can realize an economical low cost travel. A distribution center for distributing distribution data such as travel information and so on can collect advertisement incomes from travel agencies and travel advertisement firms to able to make a commercial profit in business and thus can always obtain and distribute fresh information to the user. The traveler can also receive the updated and useful information.

Further, in the travel information distribution system of the present invention, the time tolerance of the arrival date and time shown in the schedule table prepared by the schedule table preparator is calculated using the tolerance calculator, and the arrival date corrector corrects the arrival date and time to the earliest one on the basis of the calculated tolerance (difference). Thus, for example, when a bus arrives one hour ahead of schedule, such a situation can be properly dealt with to conduct the distribution of the data properly. Hence, at the arrival to the destination, the distribution data has received by the user, and the necessary information can be immediately utilized.

In accordance with another aspect of the present invention, there is provided a travel information distribution system comprising: a travel information distribution system comprising: a schedule table preparator for preparing a schedule table containing destinations as reference places for obtaining information in a traveling, position information of the destinations and distribution data to be distributed to a wireless terminal of a user in the reference places from an itinerary table of a travel; a position information detector for detecting position information as a present place of the wireless terminal carried in the travel; a destination position information comparator for comparing the position information detected by the position information detector with position information of destinations shown in the schedule table prepared by the schedule table preparator; and a data distributor for distributing distribution data related to the coincident destination to a wireless terminal via a network when the position information of any destination shown in the prepared schedule table is coincident with the position information detected by the position information detector by the comparison of the destination position information comparator.

In the travel information distribution system of the present invention, the distribution of the distribution data is carried out based on the place or the destination. That is, the schedule table preparator prepares the schedule table for containing the destination as the reference places for obtaining necessary information in the traveling, the position information of respective destinations and the distribution data to be distributed to the wireless terminal of the user in the destinations from the itinerary table of the travel, and the destination position information comparator compares the position information detected by the position information detector with the position information of the destinations shown in the schedule table prepared by the schedule table preparator. The data distributor distributes the distribution data related to the coincident destination to the wireless terminal via the network when the position information of any destination is coincident with the position information detected by the position information detector. Thus, the user travels to the destinations and can receive the proper distribution data in respective destinations. Hence, when the time to arrive to the destination is changed or the destination to be visited in the morning is interchanged with the destination to be visited in the afternoon, the user can receive the proper distribution data at the time when arriving at respective destinations.

In accordance with another aspect of the present invention, there is provided a travel information distribution system comprising: a travel information distribution system comprising: a schedule table preparator for preparing a schedule table containing destinations as reference places for obtaining information in a traveling, position information of the destinations and distribution data to be distributed to a wireless terminal of a user in the reference places from an itinerary table of a travel; a position information detector for detecting position information as a present place of the wireless terminal carried in the travel; a tolerance table containing differences between position information of reference positions of respective destinations and position information of border positions of respective destinations shown in the schedule table prepared by the schedule table preparator; an area calculator for calculating areas of respective destinations from the position information of the reference positions of respective destinations and the differences shown in the tolerance table; a destination position information comparator for comparing the areas calculated by the area calculator with the position information of the wireless terminal, detected by the position information detector; and a data distributor for distributing distribution data related to the destination area including the position information of the wireless terminal to a wireless terminal via a network when the position information of the wireless terminal is included in any destination area by the comparison of the destination position information comparator.

In the travel information distribution system of the present invention, the distribution of the distribution data is carried out based on the place or the destination. That is, the schedule table preparator prepares the schedule table for containing the destination as the reference places for obtaining necessary information in the traveling, the position information of respective destinations and the distribution data to be distributed to the wireless terminal of the user in the destinations from the itinerary table of the travel, and the destination position information comparator compares the position information detected by the position information detector with the position information of the destinations shown in the schedule table prepared by the schedule table preparator. The data distributor distributes the distribution data related to the coincident destination to the wireless terminal via the network when the position information of any destination is coincident with the position information detected by the position information detector. In this case, the difference (tolerance) with respect to the place is considered. For example, in the case of certain hot spring as the destination, when the reference place is set to the center of the hot spring, the inconvenience that the distribution data cannot be distributed to the user before the user comes to the center of the hot spring can be solved. That is, by using the concept of the difference, in this instance, at the time when the user arrives at a predetermined tolerance area around the center of the hot spring, for example, arrives at the edge or the entrance of the hot spring, the distribution data can be distributed, and the user can make use of the received information of the hot spring from that time without delay. Thus, the user travels to the destinations and can receive the proper distribution data in respective destinations. Hence, when the time to arrive to the destination is changed or the destination to be visited in the morning is interchanged with the destination to be visited in the afternoon, the user can receive the proper distribution data at the time when arriving at respective destinations.

In a travel information distribution system of the present invention, the wireless terminal includes: a distribution data identifying information storage for storing identifying information for identifying the distribution data distributed by the data distributor; a specifier for specifying one of a presence and an absence of use of the distribution data related to the identifying information stored in the distribution data identifying information storage; and a notifier for notifying the data distributor of the distribution data specified by the specifier after finishing of the travel.

In the travel information distribution system of the present invention, the distribution data identifying information storage stores the identifying information for specifying the distribution data distributed by the data distributor, and the identifying information is attached with the used mark for representing the presence or absence of the use of the distribution data. The identifying information is sent to the data distributor after the finish of the travel, and the data distributor can check which identifying information has been used. Hence, a preparation of usable data and a setting of a data distribution timing can be improved.

In a travel information distribution system of the present invention, the wireless terminal includes: a place specifier for specifying the places where the user has used the distribution data distributed by the data distributor; a place storage for storing the places specified by the place specifier; and a notifier for notifying the data distributor of the places stored in the place storage after finishing of the travel.

In the travel information distribution system of the present invention, the places where the user has used the distribution data distributed by the data distributor are determined, and the data distributor is notified of such places after the finish of the travel. Accordingly, the using situation of the distribution data related to the places is analyzed to be able to know where the information can be effectively used and the place where the travelers need not the information as statistical values. The analyzed result can be effectively used for selection of the places for providing the information.

In a travel information distribution system of the present invention, the wireless terminal includes a position information transmitter for transmitting the position information to the data distributor at a certain time interval, and the data distributor includes: a personal schedule table containing times and places of the wireless terminal according to the travel schedule; a tolerance calculator for calculating tolerances (differences) between the position information transmitted from the position information transmitter and the schedule written in the personal schedule table on the basis of the time when the position information transmitter transmits the position information; and a schedule table renewer for renewing the schedule table for the distribution of the distribution data by reflecting the calculation result of the tolerance calculator.

In the travel information distribution system of the present invention, the data distributor is notified of the present position of the wireless terminal at the predetermined time interval in order to check whether or not the wireless terminal moves on schedule with respect to the relationship between the notifying time and the notified place. Hence, differences (tolerances) with respect to a schedule written in a personal schedule table are calculated, and when the schedule is delayed or advanced, the schedule can be changed at need. As a result, the distribution of the data can be carried out at good timing in each place.

In a travel information distribution system of the present invention, the wireless terminal includes: a schedule table receiver for receiving a schedule table prepared by the schedule table preparator; and a distribution data transmitting requester for requesting the data distributor to transmit distribution data at a distribution timing of respective distribution data on the basis of the schedule table received by the schedule table receiver.

In the travel information distribution system of the present invention, the wireless terminal of the user receives the travel schedule table of the user and stores it. The user can always confirm the schedule table itself. Further, the user requests a data distributor to transmit distribution data to the wireless terminal of the user on the basis of the schedule table, and when the transmitting is not carried out for some reason, the user of the wireless terminal can make the request again. When the user of the wireless terminal changes the schedule such as moving up a part of the schedule, the user requests the data distributor to transmit the distribution data to the wireless terminal according to the changed schedule and thus can exactly obtain the distribution data at a proper timing.

In a travel information distribution system of the present invention, the wireless terminal includes: a schedule table receiver for receiving a schedule table containing a schedule for a distribution of distribution data; a schedule table storage for storing the schedule table received by the schedule table receiver; a comparator for comparing distribution data, a distribution time and a distribution place when the distribution data is distributed with a distribution data, a distribution time and a distribution place written in the schedule table stored in the schedule table storage; and a tolerance data transmitter for transmitting tolerances of the distribution time and place of the schedule table as the comparison result of the comparator as tolerance data, and the data distributor includes a schedule table renewer for renewing the contents of the schedule table by reflecting the tolerance data transmitted from the tolerance data transmitter.

In the travel information distribution system of the present invention, the wireless terminal of the user receives the travel schedule table of the user and stores it. The user checks whether or not the schedule shown in the stored schedule table is carried out on schedule with respect to the timing and the place of the data distribution. When the timing or the place of the data distribution is shifted, the user sends back the tolerance as tolerance data to the data distributor using tolerance data transmitter, and the data distributor reflects the received tolerance data to the schedule table to renew the contents of the schedule table. In this embodiment, of course, a new schedule table may be prepared each occasion.

In a travel information distribution system of the present invention, the tolerance calculator calculates the tolerances (differences) by multiplying tolerances based on kinds of transport means for arriving at respective places by respective factors determined according to dates of moving.

In the travel information distribution system of the present invention, when the traveler moves using a transport means such as a bus, a train or the like, a time tolerance can be caused in arriving at the destination depending on the kind of the transport means and also depending on the kind of the date of moving, such as a holiday, a sunday, a weekday, a day in month, a day in year or the like. Based on these two facts, the tolerance is calculated by multiplying a tolerance (difference) based on the kind of the transport means by a factor based on the day of moving, and the timing of the data distribution can be set considering the calculated tolerance.

In a travel information distribution system of the present invention, the tolerance calculator calculates the tolerances by multiplying tolerances based on kinds of transport means for arriving at respective places by respective factors determined according to time bands of moving.

In the travel information distribution system of the present invention, when the traveler moves using a transport means such as a bus, a train or the like, a time difference (tolerance) can be caused in arriving at the destination depending on the kind of the transport means and also depending on the time of moving such as a commuting time, or rush hours in the morning and evening, in the night, a certain time band of day, or the like. Based on these two facts, the tolerance is calculated by multiplying a tolerance based on the kind of the transport means by a factor based on the time or time band of moving, and the timing of the data distribution can be set considering the calculated tolerance (difference).

In a travel information distribution system of the present invention, the tolerance calculator calculates the tolerances by multiplying tolerances (differences) based on kinds of transport means for arriving at respective places by respective factors determined according to dates and time bands of moving.

In the travel information distribution system of the present invention, the tolerances are calculated by considering all main factors. Thus, the tolerances can be varied by dealing with various situations, and the distribution of the distribution data can be precisely performed to meet the various situations.

In a travel information distribution system of the present invention, the distribution data is distributed to the wireless terminal by an e-mail.

In the travel information distribution system of the present invention, the e-mail can be transmitted as the distribution data from the distribution center to the wireless terminal, and the information distribution can be executed by a terminal having a small display in size like a portable telephone. Further, since a load required for an information communication is small, the communication can be carried out rapidly, and the necessary information can be distributed without delay.

In a travel information distribution system of the present invention, the distribution data is distributed to the wireless terminal by a file described by a descriptive language.

In the travel information distribution system of the present invention, the distribution data can be distributed to the wireless terminal in the form of the file described by the descriptive language. When the wireless terminal can view the information described by the descriptive language such as a hypertext markup language like a laptop personal computer can do, the information with power of rich expression can be obtained by accessing to such information.

In a travel information distribution system of the present invention, the distribution data includes addresses of contents on the network, and the wireless terminal accesses to the addresses to download necessary contents.

In the travel information distribution system of the present invention, the distribution data includes the addresses of the contents on the network, and the wireless terminal can access to the addresses to download necessary contents. Hence, by flying from information of an information provider to a further linked information, the information desired by the user of the wireless terminal can be obtained.

BRIEF DESCRIPTION OF THE DRAWINGS

The objects, features and advantages of the present invention will become more apparent from the consideration of the following detailed description, taken in conjunction with the accompanying drawings, in which:

FIG. 2 is an explanatory view showing a combination of information names, distribution timings of information and contents of the distributed information used in a travel information distribution system according to first embodiment shown in FIG. 1;

FIG. 4 is a fragmentary explanatory view showing a travel schedule table of "The Sea of Japan Tour in winter" applied by a user of the travel information distribution system according to first embodiment shown in FIG. 3;

FIG. 8 is an explanatory view showing a travel schedule table according to first embodiment shown in FIG. 6;

FIG. 9 is a fragmentary explanatory view showing a tolerance table according to first embodiment shown in FIG. 5;

FIG. 10 is a fragmentary explanatory view showing a factor table according to first embodiment shown in FIG. 5;

FIG. 11 is a fragmentary explanatory view showing an information address table according to first embodiment shown in FIG. 5;

FIG. 12 is a fragmentary explanatory view showing a distribution schedule table according to first embodiment shown in FIG. 5;

FIG. 18 is a block diagram of an essential part of a data distribution system according to a fourth modified embodiment of the present invention;

FIG. 20 is a fragmentary explanatory view showing one example of a factor table with reference to a time band in a data distribution system according to a sixth modified embodiment of the present invention;

FIG. 24 is an explanatory view showing one example of a distribution schedule table used in the data distribution system according to the eighth modified embodiment of the present invention.

DESCRIPTION OF THE PREFERRED EMBODIMENTS

First Embodiment

Figure 1:
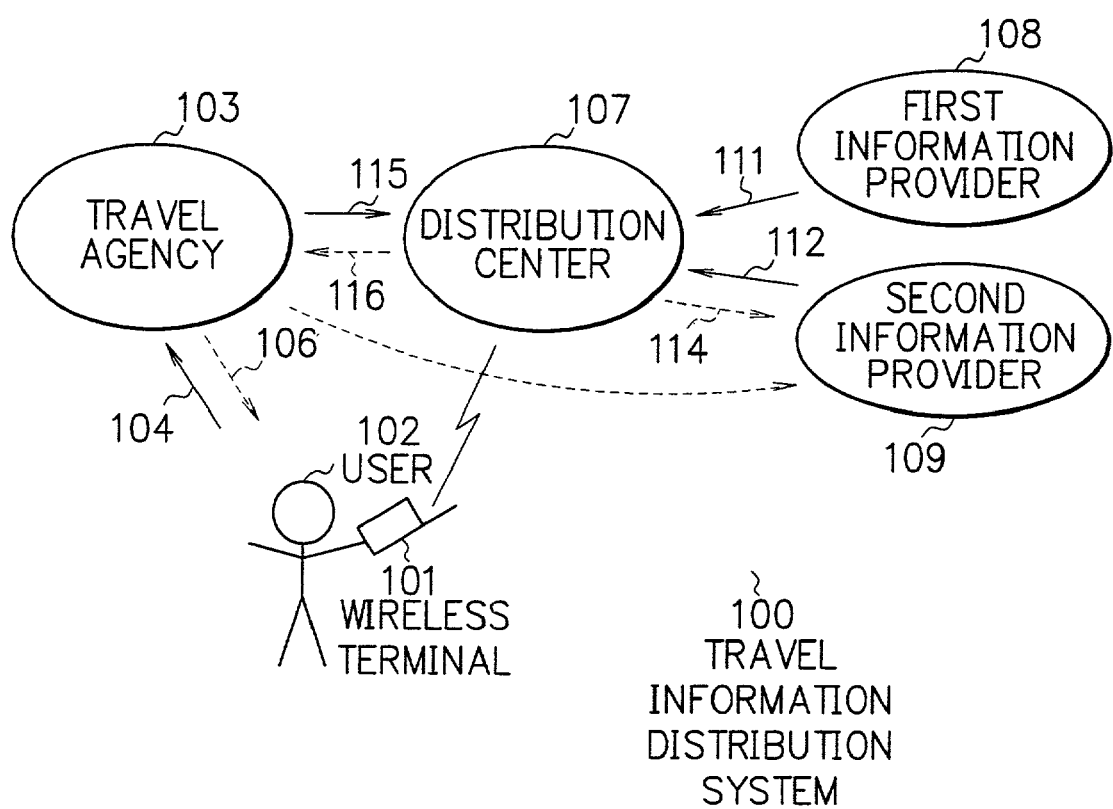
FIG. 1 is a schematic diagram showing a travel information distribution system according to first embodiment of the present invention.

Referring now to the drawings, there is shown in FIG. 1 a travel information distribution system for distributing data such as travel information and the like to a wireless terminal or the like of a user according to the first embodiment of the present invention.

FIG. 1 is a schematic diagram showing a travel information distribution system according to one embodiment of the present invention.

In FIG. 1, a travel information distribution system 100 for distributing data such as travel information and the like to a wireless terminal or the like of a user is used by a user 102 carrying a wireless terminal 101 such as a portable telephone, a portable computer or the like when the user 102 makes a journey. The user 102 visits a travel agency 103 to make an application 104 for a travel, has a travel schedule drawn up, and has the travel agency 103 buy and reserve the necessary travel tickets. The travel agency 103 carries out not only such service but also signing of a contract with the user 102 to make provision service of travel information to the user 102 and this provision service of the travel information constitutes a part of a charge 106 of a travel cost. The provision service of the travel information is distribution service of information to the wireless terminal 101 and a distribution center 107 performs this information distribution service. The distribution center 107 may obtain the travel information as such service by its own efforts. However, usually, the distribution center 107 obtains the travel information 111 and 112 from a first information provider 108 and/or a second information provider 109, treats the obtained travel information properly, and distributes the travel information to the wireless terminal 101 using a push technique.

In this case, the first information provider 108 is defined as one who provides travel information regardless of commercial interests. For example, a travel bureau of a local public entity or a government and a private person, who do not directly obtain a profit by providing the travel information 111, are the first information provider 108. Hence, the distribution center 107 does not charge the first information provider 108 any fee such as an advertisement cost or the like even when distributing the travel information 111 provided by the first information provider 108 to the wireless terminal 101. Thanking for providing important travel information, a good plot such as giving the first information provider 108 a present may be carried out.

Meanwhile, the second information provider 109 is defined as one who provides travel information accompanied by commercial interests. For example, a travel agency dealing with optional tours in an actual place, a store or a shopping mall dealing in souvenirs in a traveling place, a market, a chamber of commerce and industry, transport facilities, a hotel, an inn and so forth are the second information provider 109. Accordingly, when the second information provider 109 provides an advertisement only or travel information 112 along with an advertisement, the distribution center 107 charges the second information provider 109 a predetermined advertisement cost 114 for the distribution of the travel information 112 of the second information provider 109.

Further, the travel agency 103 makes a distribution request 115 to the distribution center 107 for providing the proper travel information to the user 102 on an ad-hoc basis, and the distribution center 107 charges the travel agency 103 a distribution cost 116 for a part of the cost for carrying out the distribution service. In the travel information distribution system 100 of the present embodiment, the distribution center 107 manages the advertisement income from the second information provider 109 as a source of a large income, and with the intention of reducing the economic load of the user 102 as the traveler, a contrivance such as reducing the charge of the contribution cost 116 to the travel agency 103 to a relatively low amount is performed. The distribution center 107 sends the information to be required for the user 102 in the traveling place to the wireless terminal 101 in the form of a short mail with a limited number of letters at the necessary timing. Of course, the type of the data that the distribution center 107 distributes to the wireless terminal 101 is not restricted to this. For instance, the kind of the wireless terminal 101 is recorded, and, when there is enough room to display a large number of letters and an image like a wireless terminal of a laptop computer having a wireless function can do, a relatively much data amount of image information may be attached to a mail or the travel information may be distributed on a screen of a browser.

Hence, the distribution center 107 stores the information sent from the first and the second information providers 108 and 109 via an e-mail or a facsimile. The distribution center 107 also refers to various sites on the WWW (World Wide Web) and stores the information to be distributed to the travel agency 103 dealing in various travels in connection with the traveling places and the dates and hours when the distribution is carried out. Further, the distribution center 107 always updates the stored information by the up-to-date information and edits the information to the type of mails transmittable to the wireless terminal 101.

The information required for the travelers includes various information before and after the travel besides during the traveling. The information during the traveling includes unchangeable information such as explanations of historic spots and the like which are few changed after once prepared, and changeable information such as event information which is predetermined through about one year in most cases but whose contents are changeable every time when the travel is planned. Further, there is individual information for the users 102 or the travelers such as hotels and inns and their room numbers, weather information of target traveling places, and so on. The information required during the traveling is distributed to the wireless terminal 101 of the user 102 in the necessary traveling places at proper times on the arrival days. The information required before and after the traveling is distributed to the wireless terminal 101 of the user at proper timings in the preparation of the travel or after the finish of the travel.

FIG. 2 shows one example of a combination of names of information, distribution timings of information and contents of the distributed information prepared in the travel information distribution system according to the first embodiment shown in FIG. 1. In this embodiment, the information to be distributed is controlled by time or date and hour. In FIG. 2, a distribution information storage area 121 is prepared for every code number 122 of a travel corresponding to a user 102 and is composed of a first information section 123 for containing unchangeable information whose contents can be determined before the departure of the travel and a second information section 124 for containing changeable information whose contents cannot be determined before the departure of the travel and can be gradually determined after the departure of the travel. When another travel having a similar schedule is planned, since the two information sections 123 and 124 are provided, the previous travel plan can be utilized by mainly changing the second information section 124 and the travel agency 103 can rapidly deal with the next travel plan of another user 102. The unchangeable information determined before the departure of the travel includes, for example, an itinerary table 125 showing a daily schedule of a travel, an explanation 126 of a sight-seeing place, a telephone contact 127 to a lodging hotels or inn, a telephone contact to a tour conductor 128 and so on. A corrected itinerary table 125 may be distributed to the user 102 when the daily schedule of the travel is changed due to any cause before the departure of the travel. Further,for instance, maps are distributed just before the traveler arrives at a stopping place, and the necessary information in that place such as a sketch map of the stopping place, a place of a toilet, a meeting place and the like is distributed.

The second information section 124 contains the changeable information, and the contents of the changeable information are not determined before the departure of the travel and are then gradually determined after the departure of the travel. For example, the seat numbers of a bus or a train may be predetermined, and in certain case, may not be determined before the travel is started by selecting a small travel as an option on that day. In the latter case, the users 102 are notified of that situation at their wireless terminals 101 in advance and at the same time, the seat numbers for the users 102 and a sketch map of the bus or the train may be distributed right before the users 102 get in the bus or the train. A room allocation of a hotel to the users 102 is performed before the users 102 arrive at the hotel and the room allocation result is distributed to the users 102 when the users 102 reach the hotel. Thus, each user 102 need not require having a particular memo and can lodge in his own room without fail. In this case, the second information section 124 for containing the changeable information is provided and the necessary information is distributed to the user 102 just before that time. In this way, the timely information can be provided to the user 102, and the number of times of information changes can be reduced, with the result of preventing the occurrence of the mistake due to the crossing of the information. Hence, even when the user 102 cancels the travel during the traveling, the travel agency 103 can conduct the cancellation of the room of the hotel and the use of the transport facilities just before that time.

In the travel information distribution system of the present embodiment, it is premised that each user 102 carries a wireless terminal 101 during the traveling. Hence, the service to lend out the wireless terminal 101 is executed to the user 102 carrying no available wireless terminal 101 during the traveling. When the user 102 is going abroad, by lending out the wireless terminal 101 available in the traveling foreign countries or areas, the necessary information can be always provided to the user 102.

Figure 3:
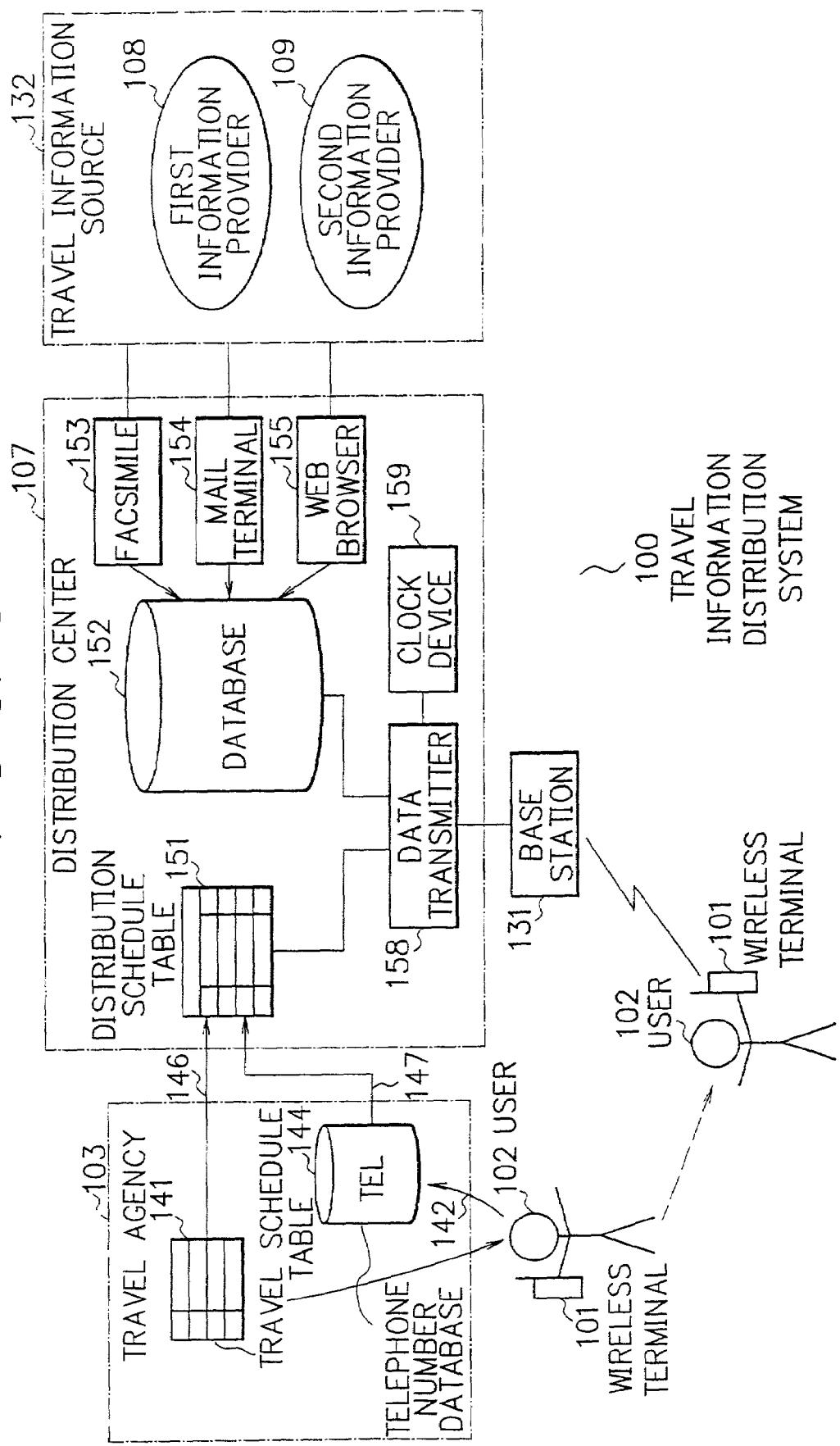
FIG. 3 is a block diagram of a travel information distribution system shown in FIG. 1.

FIG. 3 illustrates the travel information distribution system shown in FIG. 1 more specifically. The travel information distribution system 100 comprises a travel agency 103 to contact a user 102 at its window, a distribution center 107 to allow a base station 131 to distribute the necessary travel information to a wireless terminal 101 of the user 102, and a travel information source 132 including first and second information providers 108 and 109 for providing the travel information to the distribution center 107. Now, the travel information distribution system of the present invention will be described with reference to one example that the user 102 visits the travel agency 103 and makes an application of "The Sea of Japan Tour in winter".

FIG. 4 shows a part of a travel schedule table of the travel plan "The Sea of Japan Tour in winter" applied by the user 102. A travel schedule table 141 is prepared by the user 101 pursuant to an advice of a staff in charge of the travel agency 103 or based on an original plan made by the user 102 in consultation with the staff in charge. When the contents of the travel schedule table 141 are determined, the travel agency 103 registers a telephone number 142 of the wireless terminal 101 of the user 102 into a telephone number database 144 so that the telephone number 142 may correspond to the travel schedule table 141. Further, the travel agency 103 charges the user 102 the sum of a travel cost and a rental cost or a data distribution service cost of the distribution center 107 for the traveling. In this case, this travel is not accompanied by a tour conductor or a guide for taking care of the user 102 in an actual place and no personnel expenditure is required in the traveling place. Thus, the travel cost can be set to a very low cost.

The data distribution service cost charged to the user 102 is paid from the travel agency 103 to the distribution center 107 for carrying out the data distribution service. At this time, the travel agency 103 sends travel schedule table information 146 representing the travel schedule table 141 of the user 102 and telephone number information 147 about the wireless terminal 101 of the user 102 to the distribution center 107.

The distribution center 107 receives a pair of the travel schedule table information 146 and the telephone number information 147 of each user 102 (only one user is shown in FIG. 3, for example) and stores information 146 and 147 into a distribution schedule table 151. The distribution center 107 contains a database 152 dealing with many travel plans prepared by various travel agencies 103 (only one travel agency is shown in FIG. 3). The database 152, as described above, captures the information from the travel information source 132 via a facsimile 153, a mail terminal 154 and a Web browser 155. A data transmitter 158 is provided with a clock device 159 or a timer circuit, monitors the distribution schedule table 151, reads the respective distribution data out of the database 152 at every distribution time, and transmits the read-out distribution data to the wireless terminal 101 of the user 102 via the base station 131. At this time, the telephone number information 147 of the wireless terminal 101 is used as address information of the distribution target.

Figure 5:
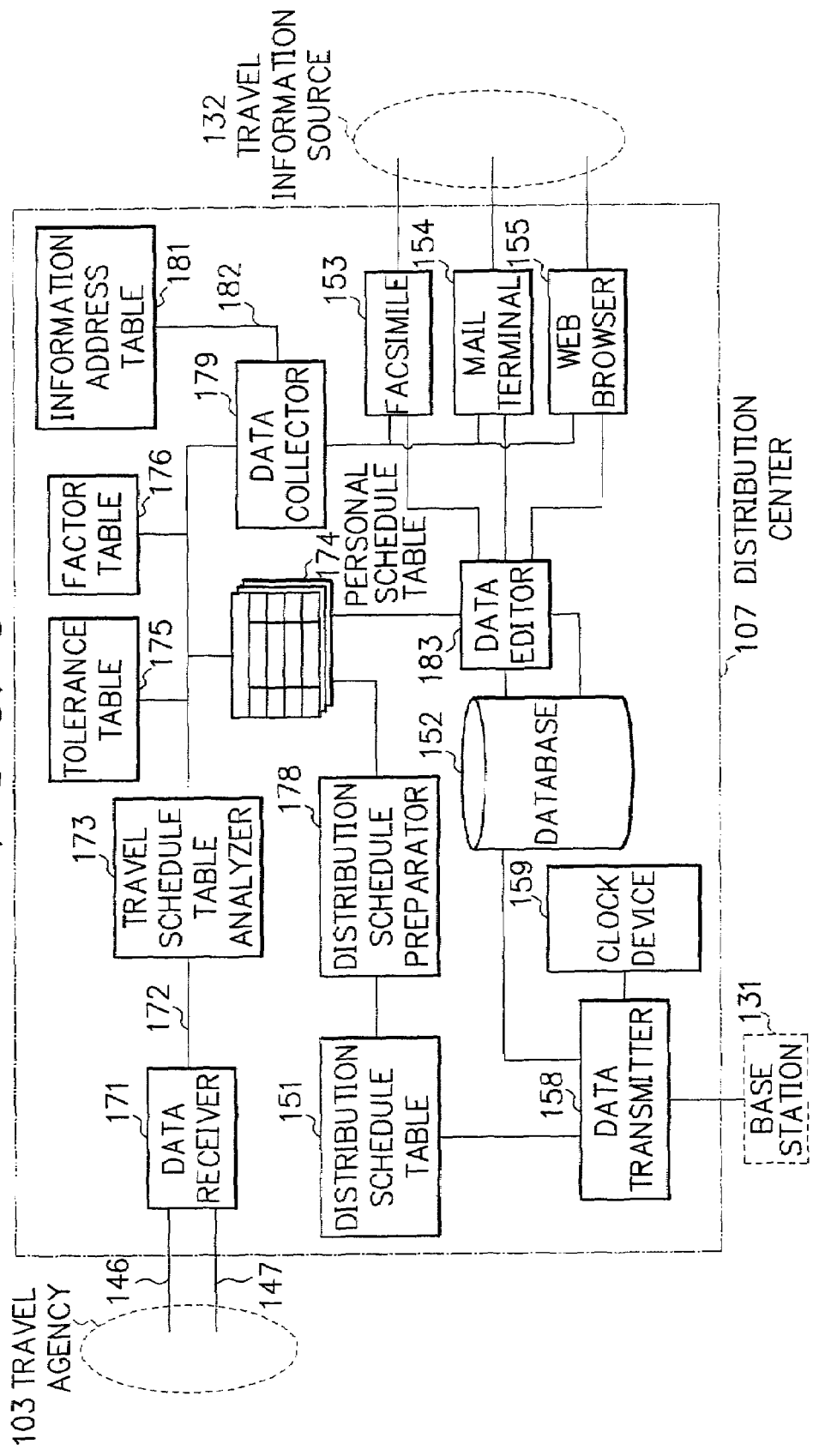
FIG. 5 is a block diagram showing a functional construction of a distribution center.

FIG. 5 shows a functional construction of the distribution center 107 shown in FIG. 3. The distribution center 107 is actually composed of a CPU (central processing unit) (not shown), a memory medium for storing programs and various input-output devices. However, in this case, the distribution center 107 realized by these components is represented as a functional construction. In FIG. 5, like reference characters designate like or corresponding parts shown in FIG. 3 and thus the repeated description thereof can be omitted.

As shown in FIG. 5, in the distribution center 107, a data receiver 171 receives the travel schedule table information 146 and the telephone number information 147 sent from the travel agency 103 via a telephone network or an Internet network (not shown), and the received data 172 is input to a travel schedule table analyzer 173 to analyze the contents of the input data. The travel schedule table analyzer 173 stores the analyzed result of the data into a personal schedule table 174. At this time, the travel schedule table analyzer 173 obtains tolerance information from a tolerance table 175 and factor information from a factor table 176. In this case, the tolerance information is the information representing a time difference (time tolerance) against an arrival time as a reference when people move by a transport means such as a train or a bus, and the factor information is a factor value to be added to the value of the tolerance information in order to obtain an actual tolerance depending on the date(year:month:day) of moving. For instance, when on the special day, a large delay is expected because the festival is held nearby, a factor value to be multiplied to a usually expected tolerance becomes larger than a usual factor value.

A distribution schedule preparator 178 prepares a distribution schedule for distributing data at each distribution time on the basis of each personal travel schedule stored in the personal schedule table 174 and stores a prepared distribution schedule into a distribution schedule table 151. At this time, each distribution time is determined so that, even when the traveler arrives at the destination, that is, the place where the distribution data is effectively used, at a time earlier than an expected time which is predetermined using the tolerance information and the factor information, the execution of the schedule may be ensured without fail.

Meanwhile, the collection of the distribution data is carried out by a data collector 179. The data collector 179 obtains necessary address information 182 for an access to information from an information address table 181. Then, for example, when the facsimile 153 is used, the data collector 179 accesses to the telephone number of the obtained address information 182 to allow the travel information source 132 to send back the necessary information. When the mail terminal 154 is used, the data collector 179 mails to the e-mail address of the obtained address information 182 to allow the travel information source 132 to send back the necessary information via the e-mail. Further, when the Web browser 155 is used, the data collector 179 accesses to a URL (Uniform Resource Locator) of the obtained address information 182 to allow the travel information source 132 to send back the necessary information from the desired contents. As described above, the information of the room number of the hotel to be first known on the appointed day, or the like can be properly obtained from the travel information source 132 via the facsimile 153, the mail terminal 154 or the Web browser 155. The obtained information along with the previously obtained information stored in the database 152 is sent to a data editor 183. The data editor 183 edits the obtained information to make the edited result correspond to each time shown in the personal schedule table 174. The edited result is stored in a distribution data temporary storage area (not shown) for storing the distribution data in the database 152 so that the edited result may correspond to each time shown in the personal schedule table 174.

The data transmitter 158 is provided with the clock device 159 or the timer circuit, as described above. The data transmitter 158 reads the data to be distributed to the relevant user 102 shown in FIG. 3 out of the distribution data temporary storage area of the database 152 at every time when the distribution time given in the distribution schedule table 151 comes, and transmits the read-out distribution data to the wireless terminal 101 of the user 102 via the base station 131. In this embodiment, although the information of the room number of the hotel to be first known on the appointed day can be obtained by the collecting operation of the data collector 179, however, such information may be input to the travel agency 103 which has prepared the travel schedule depending on the system. In this case, for example, the data receiver 171 may receive this kind of information obtained by the travel agency 103 and the received information may be sent to the data editor 183. That is, in the latter case, the facsimile 153, the mail terminal 154 and the Web browser 155 may be used for obtaining the general information, and the particular information such as the room numbers of the hotel, the seat numbers of the transport facilities and so forth may be obtained from the travel agency 103 without using the above three means.

Figures 6, 7:
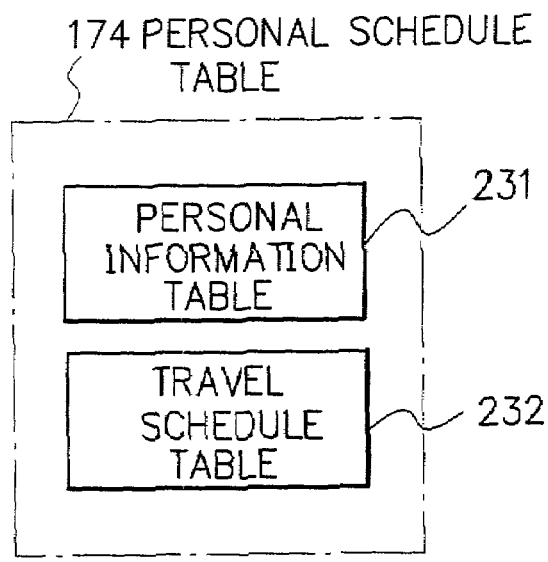
FIG. 6 is an explanatory view showing a personal schedule table according to first embodiment shown in FIG. 5.
FIG. 7 is an explanatory view showing a personal information table according to first embodiment shown in FIG. 6.

FIG. 6 shows one example of the personal schedule table 174 shown in FIG. 5. The personal schedule table 174 is composed of a personal information table 231 and a travel schedule table 232.

FIG. 7 shows one example of the personal information table 231 shown in FIG. 6. The personal information table 231 specifies the information concerning the travel of the user 102 and is composed of a "travel agency (company) identifier" for identifying the travel agency 103, a "traveler identifier" for identifying the traveler as the user 102 of the wireless terminal 101, a "wireless terminal communication address" for performing a communication with the wireless terminal 101, and a "travel schedule table pointer" for indicating the travel schedule table 232 hereinafter described.

In the personal information table 231, at least two sections (columns) of the "wireless terminal communication address" and the "travel schedule table pointer" are required. The two sections of the "travel agency identifier" and the "traveler identifier" are not always necessary. It can be thought that the latter two sections are prepared for the fee charge and the client management. In the personal information table 231 of this embodiment, the identifier of the travel agency 103 for preparing the travel schedule and selling the service of the travel is "JPN03996BN332" and the identifier of the user 102 is "M4511A-0826. When the e-mail is sent to the wireless terminal 101 of the user 102 having the "traveler identifier" of "M4511A-0826", the e-mail is sent to the address "09012345678@mobile. tel. ne. jp" as the "wireless terminal communication address" shown in FIG. 7. The "travel schedule table pointer" can be prepared by the distribution center 107 in its own way. In this case, it is "A10-523343-YN".

FIG. 8 shows one example of the travel schedule table 232 shown in FIG. 6. The travel schedule table 232 is prepared on the basis of the travel schedule table 141 specified by the user, as shown in FIG. 4. The travel schedule table 232 contains a head number "#" column numbering the heads from 1, a "date" column and a "time" column as a scheduled date and hour of an action, a "place" column as a destination (with a code) or a scheduled place of the action, a "kind" column representing the kind of the information (with a code) to be obtained, a "previous action" column showing the previous action (with a code) before the present action, a "tolerance" column showing a time difference (tolerance) per minute predicted that the tolerance is caused by the previous action, a "factor" column showing a factor representing a weight of the tolerance or a variation range per time unit, a "storage place (local)" column representing an address to which the collected data is temporarily stored in the database 152 shown in FIG. 5, and a "finish" column representing that the data collection is finished. The "finish" column "0" means that the data is not collected, and "1" means that the collected data is stored in the database 152. Hence, when all the "finish" columns are "1", the preparation for the distribution is completed.

The travel schedule table 232 shown in FIG. 8 shows the second day of the travel schedule table shown in FIG. 4. Looking at the travel schedule table 141, the traveler has taken a limited express night train from the previous day (April 6) and arrives Toyama station at 6:00 a.m. on this day (April 7). The traveler changes from the train to a bus at Toyama station and the bus departs Toyama station at 6:15 a.m. Thereafter, the bus reaches Nanao hot spring at 7:20 a.m. and the traveler plans to have breakfast there. The travel schedule up to there is written in the travel schedule table 232 shown in FIG. 8 as follows.

As shown in FIG. 8, first, concerning the head number "1", in the "date" column, the date "2000. 04. 07" of this day is written. "Toyama station (T00231)" as the arrival place is written in the "place" column. The arrival time "6:00" is written in the "time" column. The traveler has moved to Toyama station by train, and the "train moving (TRAIN)" is inserted in the "previous action" column. When the traveler arrives at Toyama station, the traveler needs to change from the train to the bus and may make some actions such as going to the toilet, buying a magazine and the like. Hence, it is predicted that a sketch map of Toyama station is required, and thus a "station map (S-MAP)" is written in the "kind" column. A time tolerance expectedly caused by a moving means is inserted in the "tolerance" column. In this case, the tolerance of the limited express train is smaller than that of the bus moving, and a small tolerance "00:05", that is, 5 minutes of the tolerance are set. In the case that there is no variation factor in tolerance of the limited express train due to days of the week and dates in particular, "1.0" as a factor value is given in the "factor" column. For example, when the factor value is "2.0", twice the tolerance written in the "tolerance" column can be predicted. However, in the case of "1.0" of the factor value, there is no variation range in the tolerance, and the tolerance value written in the "tolerance" column is a range of the caused tolerance and is applied to the arrival time of the limited express train.

In this embodiment, when the travel goes on while the destinations are changed one by one such as moving from the first destination to the next destination using transport means such as the train, the bus and the like, the relationship between a scheduled time of an arrival to each destination and a distribution timing of distribution data can be held by two concepts such as a reference tolerance and a factor. A reference tolerance can be predicted according to the transport means and the conditions at the time of the moving start. Hence, the tolerance table 175 is prepared, and the reference tolerance can be derived from the tolerance table 175.

FIG. 9 shows a part of the tolerance table 175 shown in FIG. 5. The tolerance table 175 stores the reference tolerances of the predicted arrival time caused by the previous actions so that the reference tolerances may correspond to the "previous actions". For instance, as described above, 5 minutes of the reference tolerance arises in the train moving, and 10 minutes of the reference tolerance in the bus moving.

FIG. 10 shows a part of the factor table 176 shown in FIG. 5. The factor table 176 stores the factors representing the variation ranges of the predicted tolerances which can be caused on the respective dates by using the "dates" of the travels as keys. The factor value is set to be multiplied to the tolerance value, as described above.

FIG. 11 shows a part of the information address table 181 shown in FIG. 5. In the information address table 181, by considering an "information head", that is, the information to be provided to the user 102 as a key, an "access means" for accessing to respective information and an "information source pointer" as address information when accessing are shown in parallel. For example, when the "time table of JR Higashishinnjo station" as the "information head" is obtained, the Internet information service using the WWW (World Wide Web), that is, a hypertext is utilized. In this case, the "information source pointer" is "http://www. jr-e. co. jp/timetable/shin . . . " as the URL.

In the travel schedule table 232 shown in FIG. 8, the information of the head number "1" is obtained as follows. Looking at the head number "1" of the travel schedule table 232, in the "place" column, "Toyama station" is found and in the "kind" column, the "station map" is found. Then, in the information address table 181 shown in FIG. 11, from the information head "JR Toyama station precincts map", "WWW" as the "access means" and "http://www. toyama. go. jp/kanko/map/to . . . " as the "information source pointer" are obtained. Hence, the data collector 179 loads the address information "http://www. toyama. go. jp/kanko/map/to . . . " into the Web browser 155 and gives a command for storing data into the the database 152. The Web browser 155 connects to the Internet using the received address information, downloads the data, and stores the downloaded data into the database 152. At this time, the data collector 179 instructs a storage place in the database 152 to the Web browser 155 and further writes this storage place in the "storage place" column of the travel schedule table 232. Further, when confirmed that the data is exactly obtained, the data collector 179 changes the value "0" to "1" in the "finish" column of the travel schedule table 232.

In the information address table 181 shown in FIG. 11, a "fax" (facsimile) as the "access means" is found. This means that the information can be collected by using the facsimile. In this case, the "information source pointer" is a telephone call number "012-345-6789#12" of the facsimile.

FIG. 12 shows a part of the distribution schedule table 151 shown in FIG. 5. The distribution schedule table 151 contains a "date" column as a date when data is distributed, a "time" column as a time of the data distribution, a "travel table pointer" column as address information for use in linking to the travel schedule table 232, and a head number "#" column. In the head number "#" column of the distribution schedule table 151, the head number "#" of the travel schedule table 232 shown in FIG. 8 is written.

An operation of the travel information distribution system described above will be described in connection with FIG. 13 and FIG. 14.

Figure 13:
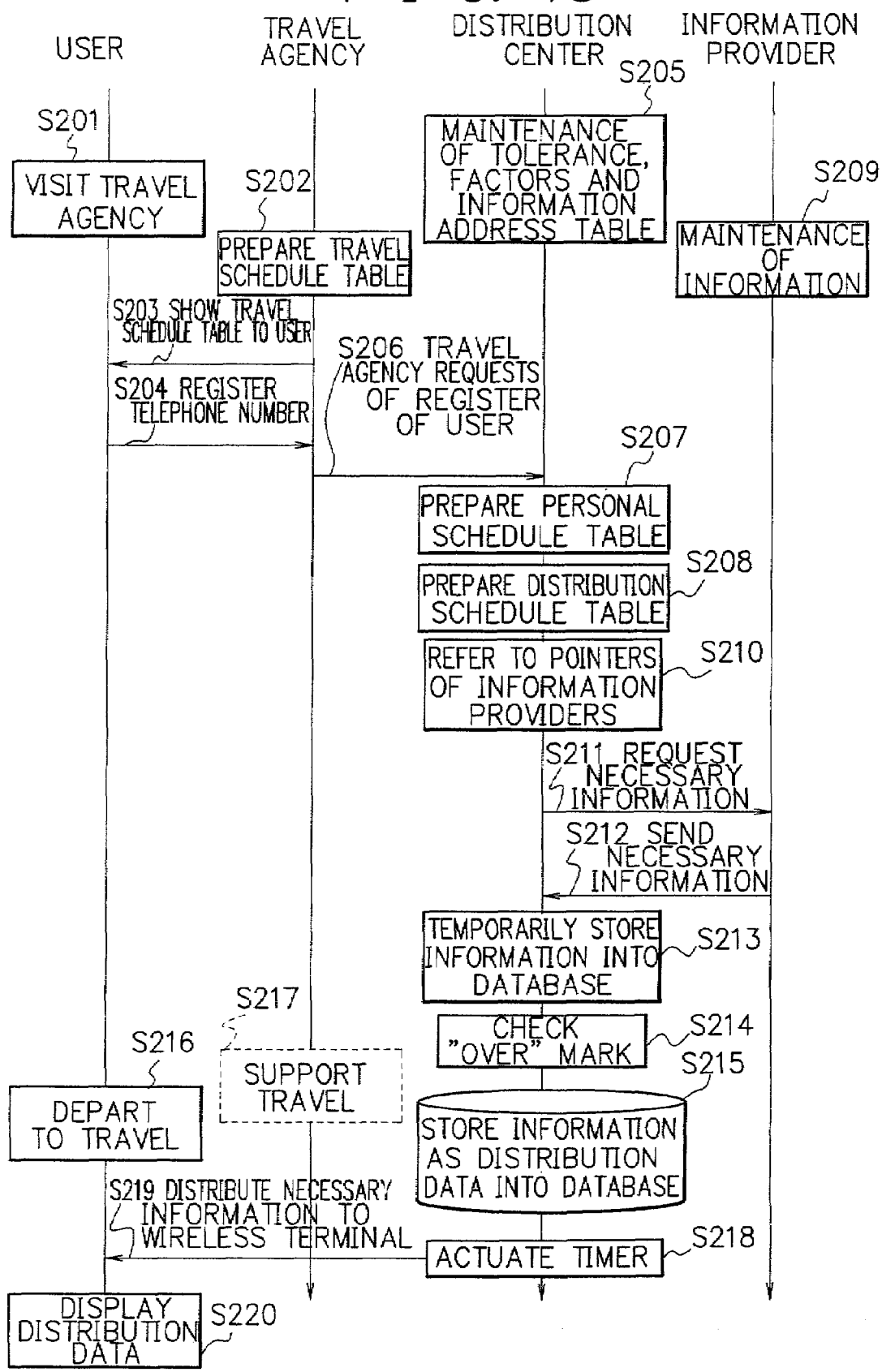
FIG. 13 is a time chart of a flow of the whole system from a visit to a travel agency to a departure of a travel by a user of a terminal in the travel information distribution system shown in FIG. 3.

FIG. 13 is a time chart of a flow of the whole system from a visit to a travel agency to a departure of a travel by a user of a wireless terminal. As shown in FIG. 3, when the user 102 visits the travel agency 103 in step S201, a staff in charge of the travel agency 103 listens to the request of the user 102 and prepares a travel schedule table 141 in step S202. Generally, the travel agency 103 prepares a plurality of travel plans as samples, and by referring to or modifying these travel plans, the travel agency 103 can prepare the travel schedule table 141 to meet each user 102. The prepared travel schedule table 141 is submitted to the user 102 in step S203. When the user 102 agrees with the contents of the travel schedule table 141, the user 102 pays a travel cost to the travel agency 103 and also pays a cost for the provision service of the travel information. In order to enjoy this provision service, the user 102 allows the travel agency 103 to register the address or the telephone number of the wireless terminal 101 of the user 102 in the telephone number database 144 in step S204.

In the case of a user 102 having no wireless terminal 101, the travel agency 103 or the distribution center 107 can lend a wireless terminal 101 to the user 102 during the traveling. Of course, the user 102 can rent a wireless terminal 101 from a usual rental shop and make a travel contract with the travel agency 103. Further, when the user 102 makes a foreign travel, the user 102 sometimes cannot use his own wireless terminal 101 in the foreign traveling place. In such a case, the travel agency 103 or the distribution center 107 can carry out the wireless terminal lend service for the user 102 in the same manner.

The distribution center 107 always carries out the maintenance for renewing the tolerance table 175, the factor table 176 and the information address table 181 shown in FIG. 5 to their up-to-date ones in step S205. Regarding the tolerance table 175 shown in FIG. 5, the maintenance includes a renewal or a reconsideration of the tolerance values, and a new preparation of the tolerance table 175. For instance, when a new expressway is constructed and no tolerance arises in the moving time to the destination using a bus, the change of the tolerance value is reflected to the tolerance table 175. When a railway schedule is revised, the tolerance table 175 is treated in the same way. The maintenance of the factor table 176 shown in FIG. 5 includes a renewal or a reconsideration of the factor values, and a new preparation of the factor table 176. For example, when an event is held with a traffic control, the factor may change on the particular date or hours. Such a change is reflected to the factor table 176 in the maintenance work.

Meanwhile, the maintenance of the information address table 181 shown in FIG. 5 means a reselection or a renewal of the travel information source 132 composed of the first and the second information providers 108 and 109 to possibly diminish the tolerances of the data to be distributed to the users 102 as the travelers, which can be often carried out by positively employing the information of the information providers who always provide the clear, understandable, concise and correct information. In order that the distribution center 107 may survive and develop as a good service dealer, it is necessary to make an endeavor to check out overall the addresses of the information providers by making efficient use of the information providers having a particular tie-up relationship or renewing the contract with such tie-up providers. Of course, the information providers 108 and 109 also should conduct the maintenance of their own information. However, the frequency and the quality of the information maintenance are not always satisfied. Hence, it is necessary for the distribution center 107 to make an effort to always excavate new information providers 108 and 109 providing new and reliable information by periodically performing the retrieval on the Internet and inviting new providers.

When the user 102 makes an application for the travel, the travel agency 103 sends the travel schedule table 141 along with the address or the telephone number of the wireless terminal 101 to the distribution center 107 and requests the distribution center 107 to register the user 102 with the address or the telephone number of the wireless terminal 103 in step S206. The distribution center 107 prepares the personal schedule table 174 in response to the request of the travel agency 103 in step S207. In the distribution center 107, the distribution schedule preparator 178 then prepares the distribution schedule table 151 on the basis of the personal schedule table 174 in step S208. This operation will be described in detail as follows.

In the distribution center 107, the data receiver 171 transfers the received travel schedule table 141 and the address of the wireless terminal 101 to the travel schedule table analyzer 173. The travel schedule table analyzer 173 picks up the "time information", the "place information" and the "Transport means information" from the travel schedule table 141 and prepares the personal schedule table 174 on the basis of the picked-up information. Then, the travel schedule table analyzer 173 fill up the tolerance column and the factor column of the personal schedule table 174 while referring to the tolerance table 175 and the factor table 176. For example, in the travel schedule table 232 shown in FIG. 8, as regards the head number "1", the "train moving" is found in the "previous action" column. Therefore, 5 minutes "00:05" as the reference tolerance during the train moving is found from the tolerance table 175 and is written in the "tolerance" column of the travel schedule table 232. The travel schedule table analyzer 173 then looks at the "date" column of the head number "1" to find "2000.04.07" as the action date and obtain the factor "1.0" from the factor table 176 by using the found date as a key. The obtained factor is written in the "factor" column of the travel schedule table 232. At this time, since the pertinent data is not captured, the "finish" column of the travel schedule table 232 is "0".

After the travel schedule table 232 is prepared as described above, the distribution schedule preparator 178 prepares the distribution schedule table 151 by referring to the personal schedule table 174. In the distribution schedule table 151, the "date" and the "time" that the data is distributed are calculated using the information in the "data" column, the "time" column, the "tolerance" column and the "factor" column of the travel schedule table 232.

Figure 14:
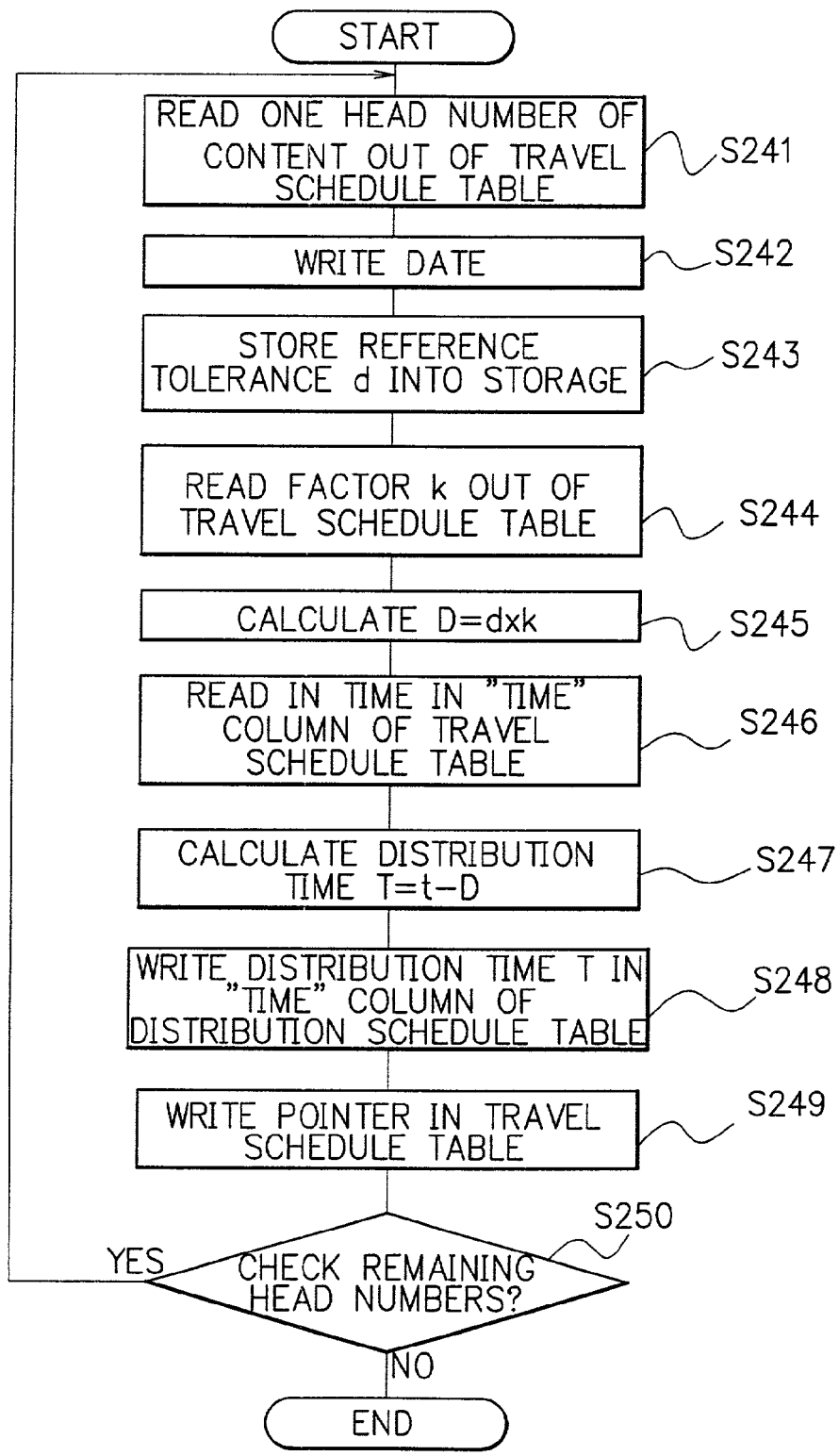
FIG. 14 is a flow chart of a process for producing a distribution schedule table according to first embodiment.

FIG. 14 shows a flow chart of a process for preparing the distribution schedule table shown in FIG. 12. First, the distribution schedule preparator 178 reads out the information of the head number "1" of the travel schedule table 232 shown in FIG. 8 in step S241, and its "date" "2000.04.07" is written as the "date" of the distribution schedule table 151 in step S242. The distribution schedule preparator 178 then reads out a value d of the reference tolerance corresponding to the "train moving" in the "previous action" column from the travel schedule table 232, and temporarily stores this reference tolerance value d, that is, 5 minutes "00:05" in the predetermined storage area in step S243. The distribution schedule preparator 178 then reads the factor k=1.0 corresponding to the "date" out of the travel schedule table 232 in step S244, and calculates the tolerance D using the following formula in step S245.

$$D\ d \times k = 5\ minutes \times 1.0 = 5\ minutes \tag{1}$$

The distribution schedule preparator 178 then reads in the information "6:00" as the time t to become the reference of the distribution specified by the "date" column and the "time" column from the travel schedule table 232 is step S246. Then, the distribution schedule preparator 178 calculates the distribution time T for executing the actual distribution using the following formula.

$$T = t - D \tag{2}$$

That is, the actual distribution time T is the value obtained by subtracting the tolerance D from the time t to become the reference of the distribution. The calculated distribution time T="05:55" is written in the "time" column of the distribution schedule table 151 in step S248. Thereafter, the travel schedule table pointer to the travel schedule table 232 is written in the distribution schedule table 151 in step S249.

After the operation described above, it is checked whether or not the remaining head numbers are present in the travel schedule table 232 in step S250. When it is discriminated that the remaining head numbers are present in the travel schedule table 232 in step S250: YES, the operation is returned to step S241 and the next head number is treated in the same manner as described above. Such an operation is repeated, and when it is discriminated that the remaining head number is not present in step S250: NO, the preparation operation of the distribution schedule table 151 is finished (END).

Now, return to FIG. 13, the travel information source 132 composed of the first and the second information providers 108 and 109 conducts the maintenance of the information to be able to cope with the updated information in step S209. The distribution center 107 refers to the pointers of the first and the second information providers 108 and 109 in step S210, and when the distribution center 107 is requested to obtain the necessary information as the distribution data in step S211, the first and the second information providers 108 and 109 of the concerned pointers transmit the requested information to the distribution center 107 in response to the request in step S212. The distribution center 107 temporarily stores the information collected in this way for becoming the base of the distribution data in the predetermined storage area of the database 152 in step S213. For the information that the collection is finished, the "finish" mark is noted in step S214, and thereafter the marked information is stored as the data to be distributed to the user 102 in the database 152 in step S215.

When the date that the user 102 departs for the travel is come in step S216, the travel agency 103 supports the travel to permit the distribution center to distribute the data consecutively at the desired timings in step S217. Accordingly, the timer is actuated or the clock device operates at every time when the predetermined date comes in step S218, and the data is distributed to the wireless terminal 101 of the user 102 in step S219. The distribution data is displayed on a display screen (not shown) of the wireless terminal 101 in step S220. Of course, the necessary information can be output in the form of voice data or displayed in the form of a motion image or a still image.

The operation of the data transmitter 158 is described more specifically as follows. That is, the data transmitter 158 is actuated by the clock device 159 or the timer circuit at every time of each record stored in the distribution schedule table 151 for distributing the data. After the actuation, the data transmitter 158 then refers to the distribution schedule table 151 and obtains the pointer to the personal schedule table 174 shown in FIG. 5 and the head number "#" of the concerned record.

In this embodiment, the data transmitter 158 is actuated by the clock device 159 or the timer circuit at 5:55 a.m. of Apr. 7, 2000 and refers to the second record of the distribution table 151 shown in FIG. 12 to obtain the travel schedule pointer "A10-523343-YN" and the head number "1". The data transmitter 158 refers to the travel schedule table shown in FIG. 8, indicated by the pointer "A10-523343-YN", of the personal schedule table 174 shown in FIG. 6 to obtain the storage place "/local/db/map001. dat" of the head number "1". Then, the data transmitter 158 reads the data indicated by the "/local/db/map001. dat" out of the database 152 and transmits the read-out data to the terminal address "09012345678@mobile. tel. ne. jp" of the wireless terminal 101. The data transmitter 158 can obtain the terminal address of the wireless terminal 101 of the user 102 from the personal information table 231 shown in FIG. 7 of the personal schedule table 174 shown in FIG. 6.

First Modified Embodiment

Although the travel information distribution system of the present invention has been described with reference to its preferred embodiments, however, various changes and modifications may be made in the present invention without departing from the spirit and the scope thereof.

A data distribution system according to a first modified embodiment of the present invention will be described in detail in connection with FIG. 15.

Figure 15:
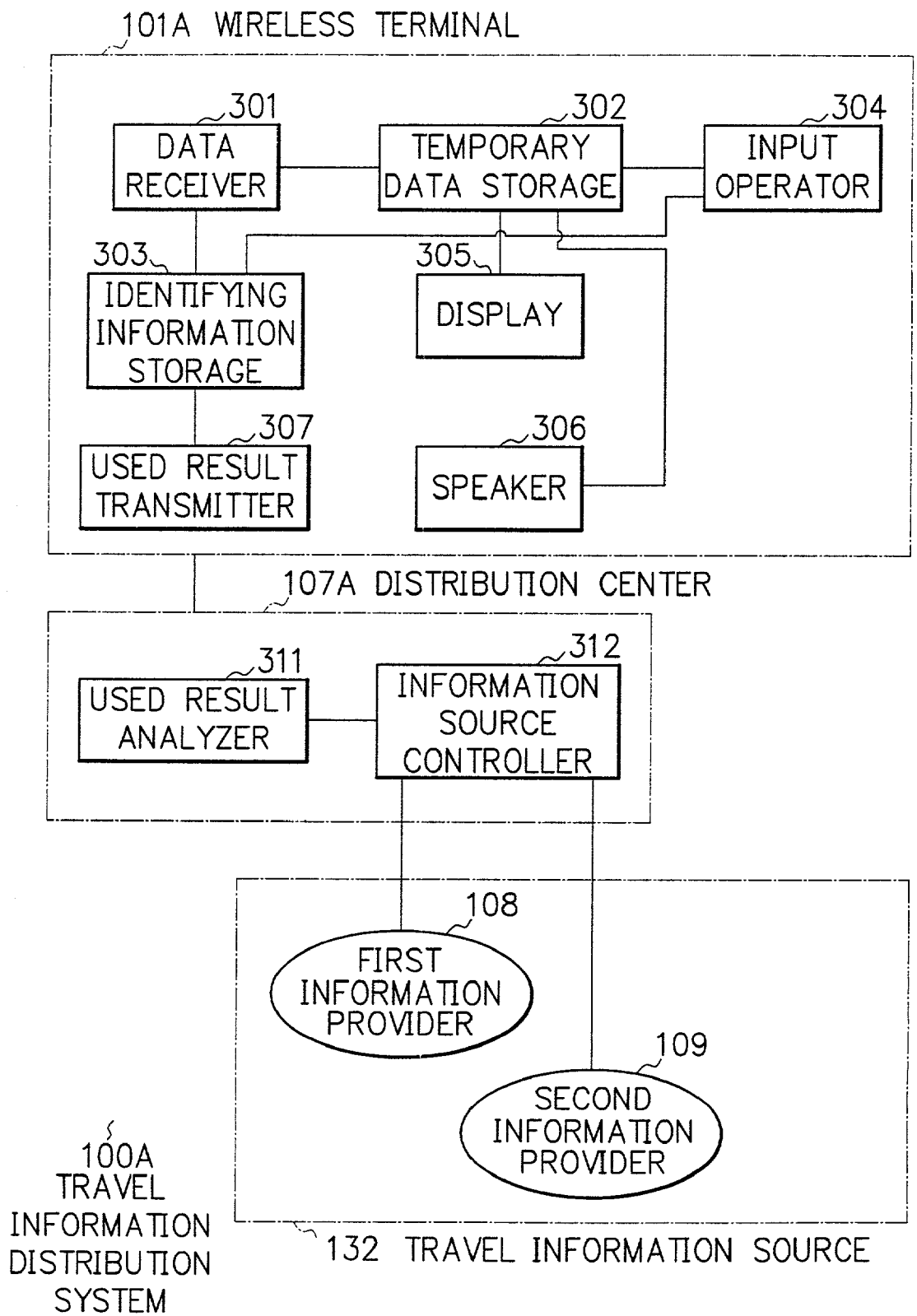
FIG. 15 is a block diagram of an essential part of a data distribution system according to a first modified embodiment of the present invention.

FIG. 15 illustrates an essential part of a data distribution system for distributing data such as travel information and the like to a wireless terminal or the like of a user according to the first modified embodiment of the present invention. A data distribution system 100A for distributing data such as travel information and the like to a wireless terminal or the like of a user comprises a wireless terminal 101A of a user 102, a distribution center 107A and a travel information source 132. In the wireless terminal 101A, a data receiver 301 receives distribution data sent from the distribution center 107A, and the received distribution data is temporarily stored in a temporary data storage 302. An identifying information storage 303 stores identifying information for identifying the distribution data temporarily stored in the temporary data storage 302. The identifying information includes a title or a URL of the distribution data and an individual number that the distribution center 107A gives as a serial number to each distribution data. When the contents of the distribution data are revised, the identifying information can identify which version the distribution data is. The temporary data storage 302 is made of a nonvolatile memory medium.

When the user 102 shown in FIG. 1 makes use of the distribution data in viewing text information or image data or listening to a sound file, the user 102 operates an input operator 304 in the wireless terminal 101A. A display 305 and a speaker 306 can be used for not only the usual wireless terminal 101A but also viewing the distribution data. The distribution data is utilized in this way and a "used" mark is attached to the identifying information of the concerned distribution data stored in the identifying information storage 303. A used result transmitter 307 sends back all lists of the identifying information of the distribution data, stored in the identifying information storage 303 and the data representing the presence or the absence of the "used" mark as used result data to the distribution center 107A at a specified timing when the user 102 has finished the travel. This sending back operation may be realized by making a request for sending from the distribution center 107A or may be automatically carried out by detecting the finish of the travel in a timer circuit or a clock device built in the wireless terminal 101A.

The distribution center 107A includes a used result analyzer 311 and an information source controller 312. The used result analyzer 311 receives the used result data from the used result transmitter 307, and analyzes the using situation of every data distributed to each user 102. The information source controller 312 transmits the analyzed result of the used result analyzer 311 in its entirety and the using situation of the distribution data of every provider to respective first and second information providers 108 and 109 constituting the travel information source 132.

The used result data transmitted from the used result transmitter 307 may contain evaluation data such as used but useless, wrong data and useless, and the like. In this case, the used result analyzer 311 checks the reliability of the data provided from every first or second information provider 108 or 109 and may feed back the checked result to respective first or second information provider 108 or 109. In some cases, the used result transmitter 307 may carry out a notice of stopping of further information providing from the providers.

Second Modified Embodiment

A data distribution system according to a second modified embodiment of the present invention will be described in detail in connection with FIG. 16.

Figure 16:
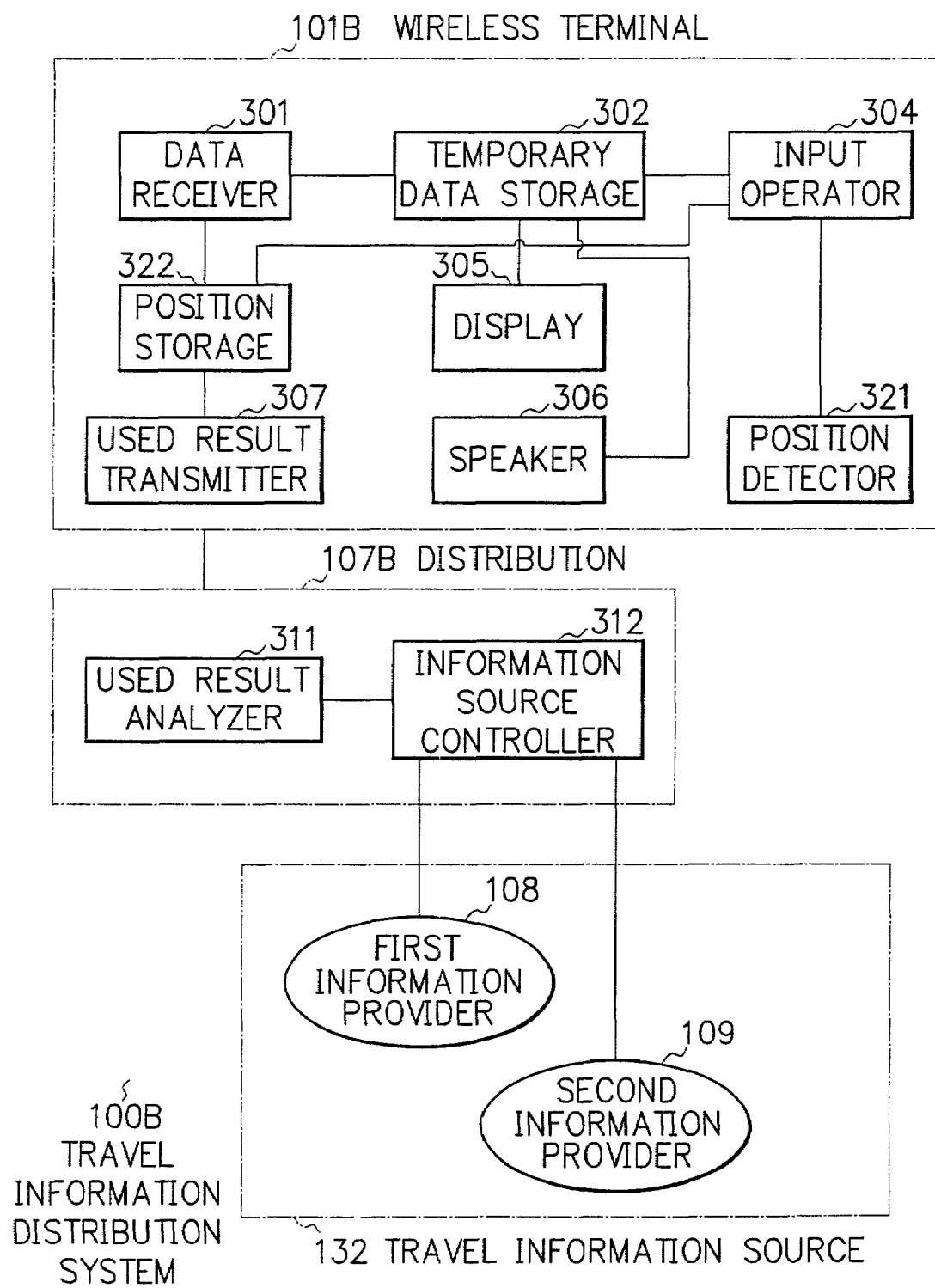
FIG. 16 is a block diagram of an essential part of a data distribution system according to a second modified embodiment of the present invention.

FIG. 16 illustrates an essential part of a data distribution system according to the second modified embodiment of the present invention. A data distribution system 100B according to the present embodiment comprises a wireless terminal 101B of a user 102, a distribution center 107B and a travel information source 132. In the wireless terminal 101B, a data receiver 301 receives distribution data sent from the distribution center 107B, and the received distribution data is temporarily stored in a temporary data storage 302. The wireless terminal 101B further includes a position detector 321 for detecting the position of the wireless terminal 101B and a position storage 322 for storing the position or place of the user 102 when the user 102 views the distribution data. Concerning the position detector 321, for example, a GPS contained D-GPS (Global Positioning System) can be used. The position storage 322 is made of a nonvolatile memory medium.

When the user 102 shown in FIG. 1 makes use of the distribution data in viewing text information or image data or listening to a sound file, the user 102 operates an input operator 304 in the wireless terminal 101B. A display 305 and a speaker 306 can be used for not only the usual wireless terminal 101B but also viewing the distribution data. The distribution data is utilized in this way and at that time the position detector 321 detects the position or the place of the user 102. This detected position or place is stored in the position storage 322. A used result transmitter 307 sends back all lists of the position information stored in the position storage 322 as used result data to the distribution center 107B at a specified timing when the user 102 has finished the travel. This sending back operation may be realized by making a request for sending from the distribution center 107B or may be automatically carried out by detecting the finish of the travel in a timer circuit or a clock device built in the wireless terminal 101B.

The distribution center 107B includes a used result analyzer 311 and an information source controller 312. The used result analyzer 311 receives the used result data from the used result transmitter 307, and analyzes the using situation of every data distributed to each user 102. The information source controller 312 transmits the analyzed result of the used result analyzer 311 to respective concerned providers of the first and second information providers 108 and 109 constituting the travel information source 132.

Third Modified Embodiment

A data distribution system according to a third modified embodiment of the present invention will be described in detail in connection with FIG. 17.

Figure 17:
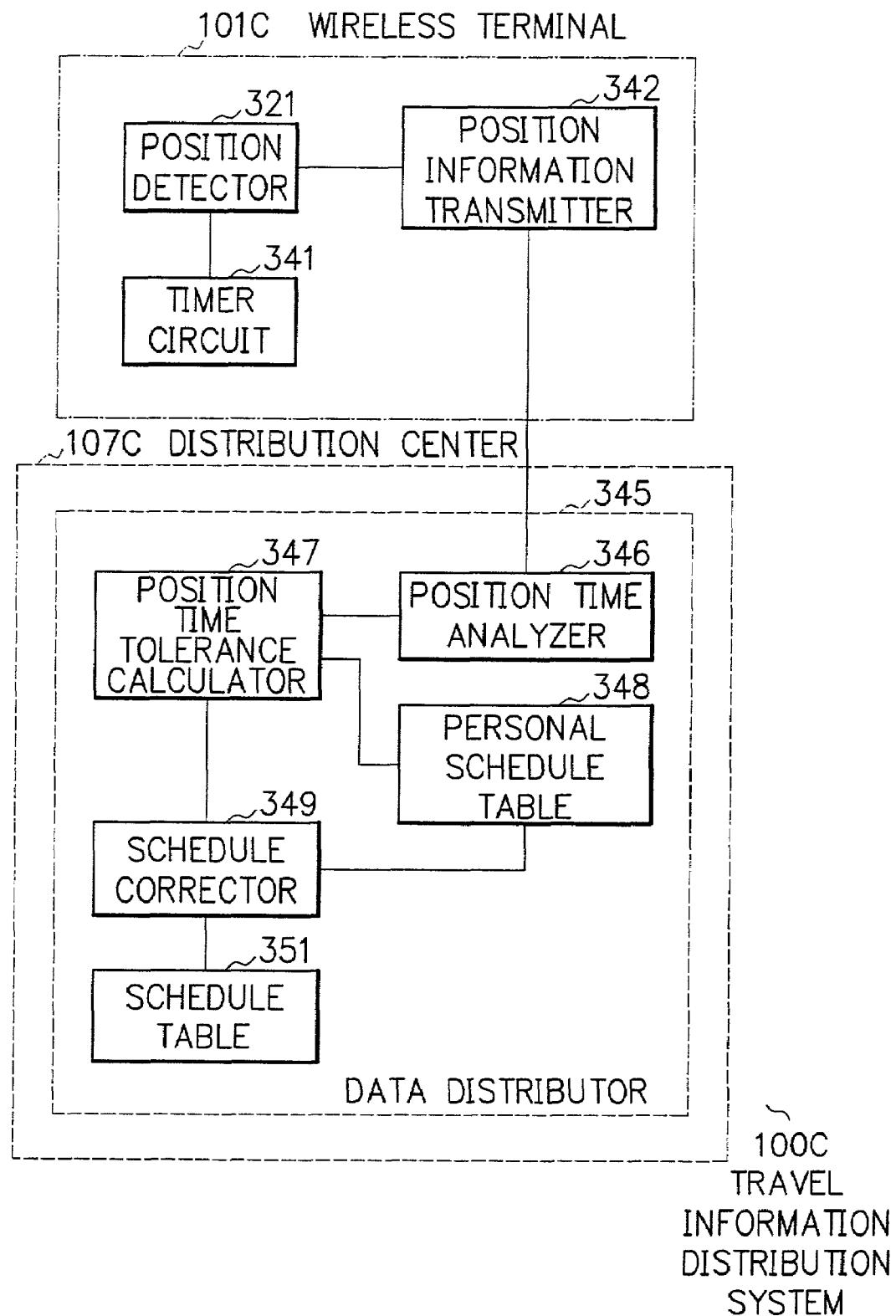
FIG. 17 is a block diagram of an essential part of a data distribution system according to a third modified embodiment of the present invention.

FIG. 17 illustrates an essential part of a data distribution system according to the third modified embodiment of the present invention. A data distribution system 100C comprises a wireless terminal 101C of a user 102 and a distribution center 107C. In the wireless terminal 101C, a position detector 321 detects the position of the user 102 when the user 102 views the distribution data. Concerning the position detector 321, for example, the GPS can be used. A timer circuit 341 sends the position detector 321 a signal for instructing the position detector 321 to periodically detect the position of the user 102. The position detector 321 sends the detected position information to a position information transmitter 342.

The position information transmitter 342 transmits the detected position information from the wireless terminal 101C to the distribution center 107C via a base station (not shown).

The distribution center 107C includes a data distributor 345 for distributing the data. In the data distributor 345, a position time analyzer 346 receives the position information from the wireless terminal 101C and sends out the position information along with time information representing the received time of the position information to a position time tolerance calculator 347. The position time tolerance calculator 347 discriminates whether or not the present time and place of the user 102 is on schedule by referring to a personal schedule table 348 for showing the personal schedule of the user 102, and calculates a time tolerances and a position tolerance(s). The position and time tolerance calculator 347 sends the calculated time and position tolerances to a schedule corrector 349. The schedule corrector 349 discriminates whether or not the received time and position tolerances are within the scheduled ranges or whether or not a delay is necessary by referring to the personal schedule table 348, and when any correction is required, the schedule corrector 349 corrects the personal schedule table 348. Further, this result is reflected to a schedule table 351 for distributing the data. Hence, for instance, the beginning scheduled time 10:00 to arrive to a hotel in Wajima by bus is delayed to 11:00, and the pertinent data is distributed to the user 102 a little earlier than 11:00.

Fourth Modified Embodiment

A data distribution system according to a fourth modified embodiment of the present invention will be described in detail in connection with FIG. 18.

FIG. 18 illustrates an essential part of a data distribution system according to the fourth modified embodiment of the present invention. A data distribution system 100D comprises a wireless terminal 101D of a user 102 and a distribution center 107D. In the wireless terminal 101D, a distribution schedule table receiver 361 receives a distribution schedule table 151 transmitted from a data transmitter 158 in the distribution center 107D before the departure of the travel. The distribution schedule table receiver 361 sends the received distribution schedule table 151 to a distribution schedule table storage 362 to store the received distribution schedule table 151 therein. A distribution data requester 363 monitors a timing to receive the distribution data using the distribution schedule table stored in the distribution schedule table storage 362 and a clock device 364. The distribution data requester 363 requests the distribution center 107D to distribute the distribution data when the time for receiving the distribution of the data comes.

In the distribution center 107D, a request receiver 365 receives the distribution request from the distribution data requester 363. The data transmitter 158 reads the pertinent distribution data out of a database 152 on the basis of the distribution request received by the request receiver 365, and transmits the read-out distribution data to the wireless terminal 101D. When once transmitting the contents of the distribution schedule table 151 to the wireless terminal 101D, the distribution center 107D may remove the distribution schedule from the predetermined storage area.

Fifth Modified Embodiment

A data distribution system according to a fifth modified embodiment of the present invention will be described in detail in connection with FIG. 19.

Figure 19:
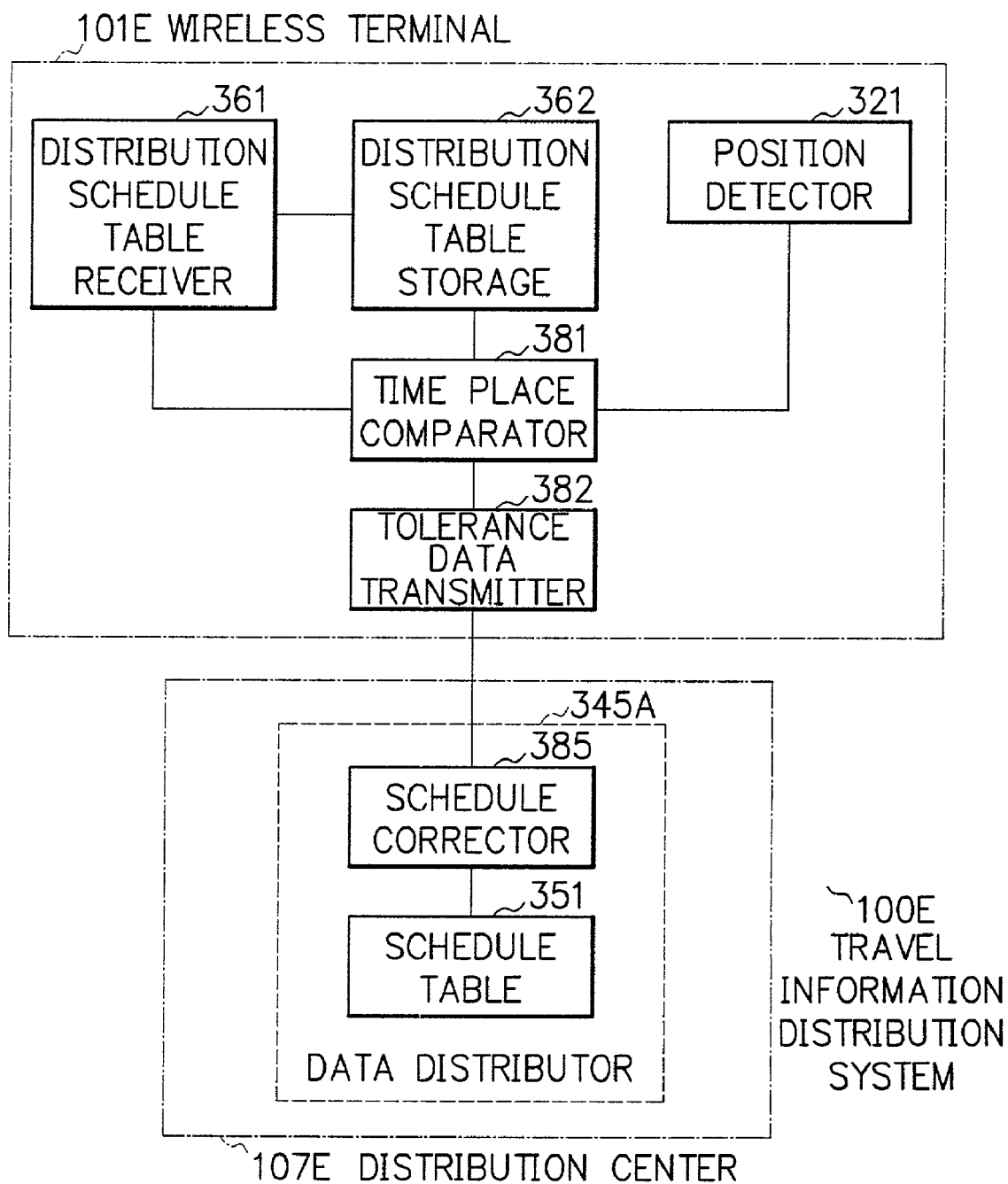
FIG. 19 is a block diagram of an essential part of a data distribution system according to a fifth modified embodiment of the present invention.

FIG. 19 illustrates an essential part of a data distribution system according to the fifth modified embodiment of the present invention. A data distribution system 100E comprises a wireless terminal 101E of a user 102 and a distribution center 107E. The wireless terminal 101E includes a schedule table receiver 361 for receiving a schedule table 351 sent from a data distributor 345A of the distribution center 107E. The received schedule table 351 is stored in a schedule table storage 362. A time place comparator 381 accesses to the schedule table storage 362 every time when the data is distributed, and compares a predetermined relationship between the distribution data and the time with an actual relationship between the distribution data and the time, detected by a position detector 321. A tolerance data transmitter 382 transmits the comparison result of the time place comparator 381, that is, the resultant relationship between the distribution data and the time as tolerance data to the distribution center 107E.

In the data distributor 345A of the distribution center 107E, a schedule corrector 385 receives the tolerance data sent from the tolerance data transmitter 382 of the wireless terminal 101E and corrects the schedule table 351 depending on the extent of the tolerance so that the user 102 may finish the travel in peace.

Sixth Modified Embodiment

A data distribution system according to a sixth modified embodiment of the present invention will be described in detail in connection with FIG. 20.

FIG. 20 shows a part of a factor table by referring to a time band in a data distribution system according to the sixth modified embodiment of the present invention. Although the tolerance is calculated using the tolerance table 175 and the factor table 176 in the first embodiment of the travel information distribution system of the present invention, as described above, however, in this sixth modified embodiment, a time band factor table 391 is used instead of the factor table 176 in which the factors changes depending on the dates in the first embodiment. This embodiment takes into consideration the fact that the tolerance range of the arrival time to the destination from the departure place changes depending on the time band of many transport means such as a bus, a train and the like. In this embodiment, for example, the tolerance can be obtained by multiplying the reference tolerance tabulated in the tolerance table 175 shown in FIG. 9 by the factor value obtained from the time band factor table 391 shown in FIG. 20.

Seventh Modified Embodiment

A data distribution system according to a seventh modified embodiment of the present invention will be described in detail in connection with FIG. 21.

Figure 21:
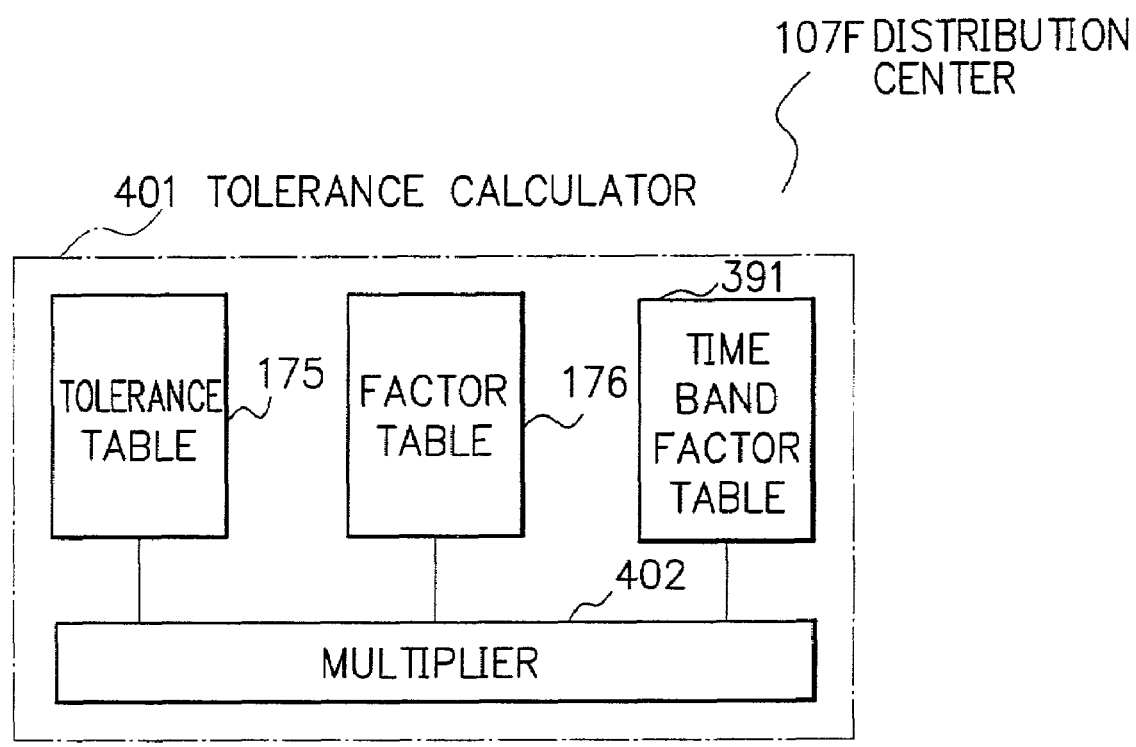
FIG. 21 is a block diagram of an essential part of a distribution center of a data distribution system according to a seventh modified embodiment of the present invention.

FIG. 21 illustrates an essential part of a distribution center of a data distribution system according to the seventh modified embodiment of the present invention. A distribution center 107F comprises an tolerance calculator 401 and a multiplier 402, and the tolerance calculator 401 includes a tolerance table 175 and a factor table 176 which are aforementioned in the first embodiment, and further a time band factor table 391 aforementioned in the sixth modified embodiment. The multiplier 402 reads the reference tolerance caused by the concerned transport means out of the tolerance table 175, reads the factor related to the moving date from the factor table 176, reads the factor related to the time band of the moving out of the time band factor table 391, and multiplies these three values to obtain the tolerance. Thus, the distribution of the relevant data is carried out at an earlier time that the arrival time is advanced by the calculated tolerance of time.

Eighth Modified Embodiment

A data distribution system according to an eighth modified embodiment of the present invention will be described in detail in connection with FIG. 22 to FIG. 25.

Although the distribution of the data is carried out with respect to the time in the above-described preferred embodiments of the present invention, however, the present invention is not restricted to these cases. Of course, the distribution of the data can be performed with respect to the position instead of the time according to the present invention. In this embodiment, a place of a wireless terminal of a user is detected and a reference tolerance of a destination is obtained. Then, the information required in the destination can be distributed to the user before the user arrives to the destination in the same manner as the case with respect to the time.

Figure 22:
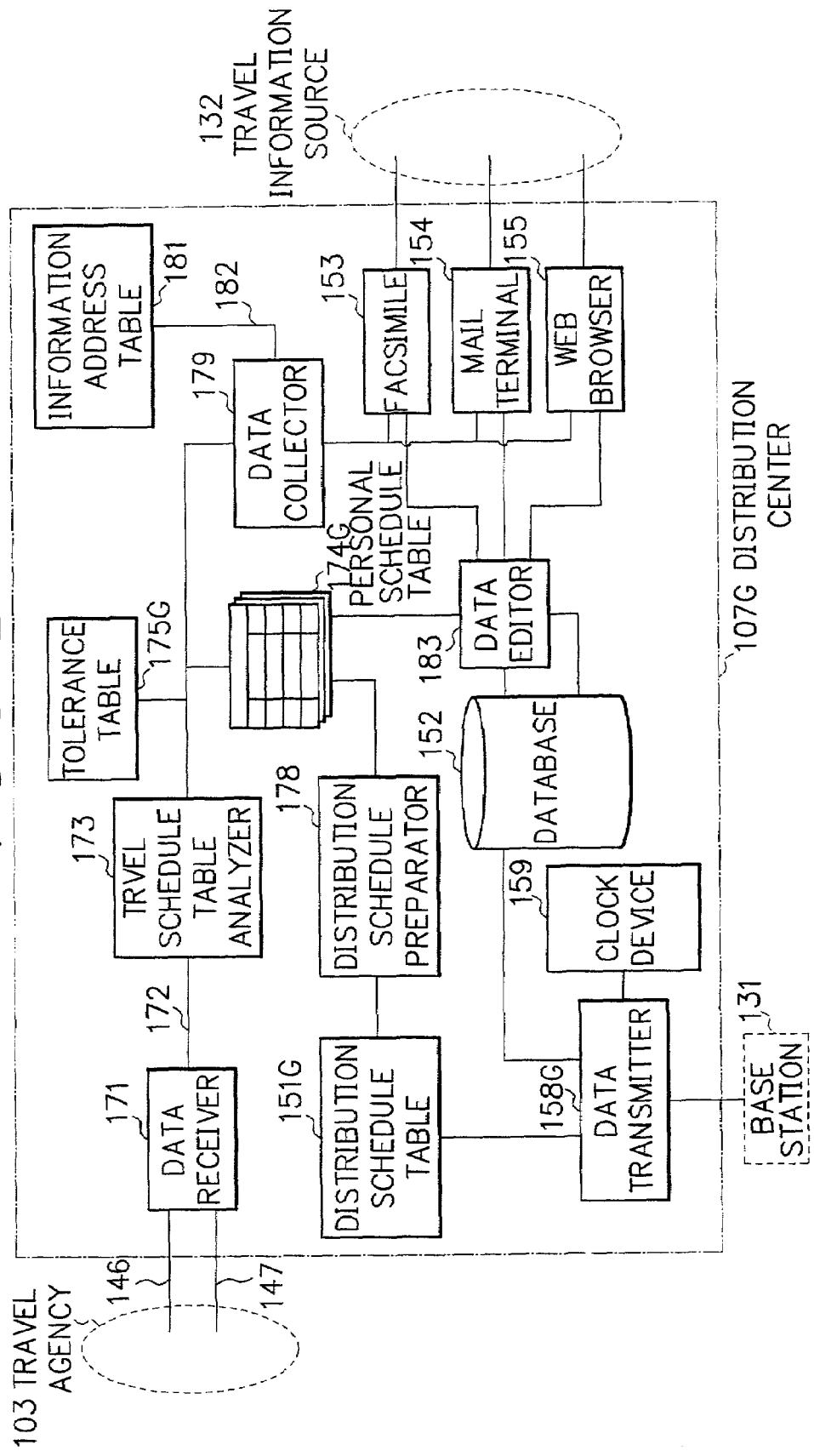
FIG. 22 is a block diagram of a distribution center of a data distribution system according to an eighth modified embodiment of the present invention.

FIG. 22 illustrates a distribution center of a travel information distribution system according to an eighth modified embodiment of the present invention, like FIG. 5 showing the distribution center of the first embodiment, wherein like reference characters designate like or corresponding parts shown in FIG. 5 and FIG. 3 and thus the repeated description thereof can be omitted for brevity. In this embodiment, a distribution center 107G includes a tolerance table 175G for tabulating destinations and their respective reference tolerances. The reference tolerances in the tolerance table 175G are reflected to a personal schedule table 174G and a distribution schedule table 151G is prepared by employing these reference tolerances.

Figure 23:
FIG. 23 is an explanatory view showing one example of a tolerance table used in the data distribution system according to the eighth modified embodiment of the present invention.

FIG. 23 shows one example of a tolerance table used in the eighth modified embodiment of the present invention. In the tolerance table 175G, destinations (places with codes), their longitudes and latitudes as position information, and reference tolerances of the destinations are tabulated. Different from the former embodiments, the reference tolerance is set depending on the situation of the destination. For example, the reference tolerance of "Toyama station" is "00° 00'01"0" hereinafter referred to as "0. 0. 1" and the reference tolerance of the next destination "Nanao hot spring" is 5 times larger value "0. 0. 5" than this value "0. 0. 1". The reason is that the differences depend on their areas around their centers. In the case of a station, a length of its platform and its internal shopping center constitute the area. For instance, "Toyama station" is specified in a position at "137° 12'58"5 E (east) longitude" and "36° 41'54"0N (north) latitude" and this position mostly indicates the center of "Toyama station". The train can arrive at the station depending on the arrival platform before arriving at the reference position. Accordingly, in consideration of such a situation, the distribution data is necessarily distributed to the user before the train arrives at the reference position. The reason why the reference tolerance of "Nanao hot spring" is large is that this name represents its hot spring streets, its whole town or its whole district, and the transport means such as a train, a bus or the like enters the territory of "Nanao hot spring" before arriving at its center or the stopping place of the transport means.

The information "T00231" attached to "Toyama station" in the "place" column of the tolerance table 175G is a destination code. That is, as shown in FIG. 8, by using the destination code "T00231" attached to "Toyama station" inserted in the "place" column as the key, the tolerance table 175G is searched. Since the reference tolerance of "Toyama station" is "0. 0. 1", the range of "0. 0. 1" becomes the reference tolerance with respect to the reference position at "137°

12'58.5" E longitude" and "36° 41'54.0" N latitude". That is, the distribution table 151G is prepared so that the distribution of the data to the wireless terminal 101 may be conducted at the place where the wireless terminal 101 of the user 102 in the train for "Toyama station" arrives at the "0. 0. 1" of short place of the reference position of "Toyama station". A data transmitter 158G distributes the data to the wireless terminal 101 of the user 102 via the base station 131.

FIG. 24 shows one example of a distribution schedule table used in the eighth modified embodiment of the present invention. In the distribution schedule table 151G, as described above, the reference tolerances shown in the tolerance table 175G shown in FIG. 23 are written in the "tolerance" column. In this case, the timing of the distribution of the data becomes the time when the wireless terminal 101 enters the area specified by the reference tolerance of the destination, this area being formed around the reference position of the destination.

A distribution operation of data in the eighth embodiment will be described in connection with FIG. 25.

Figure 25:
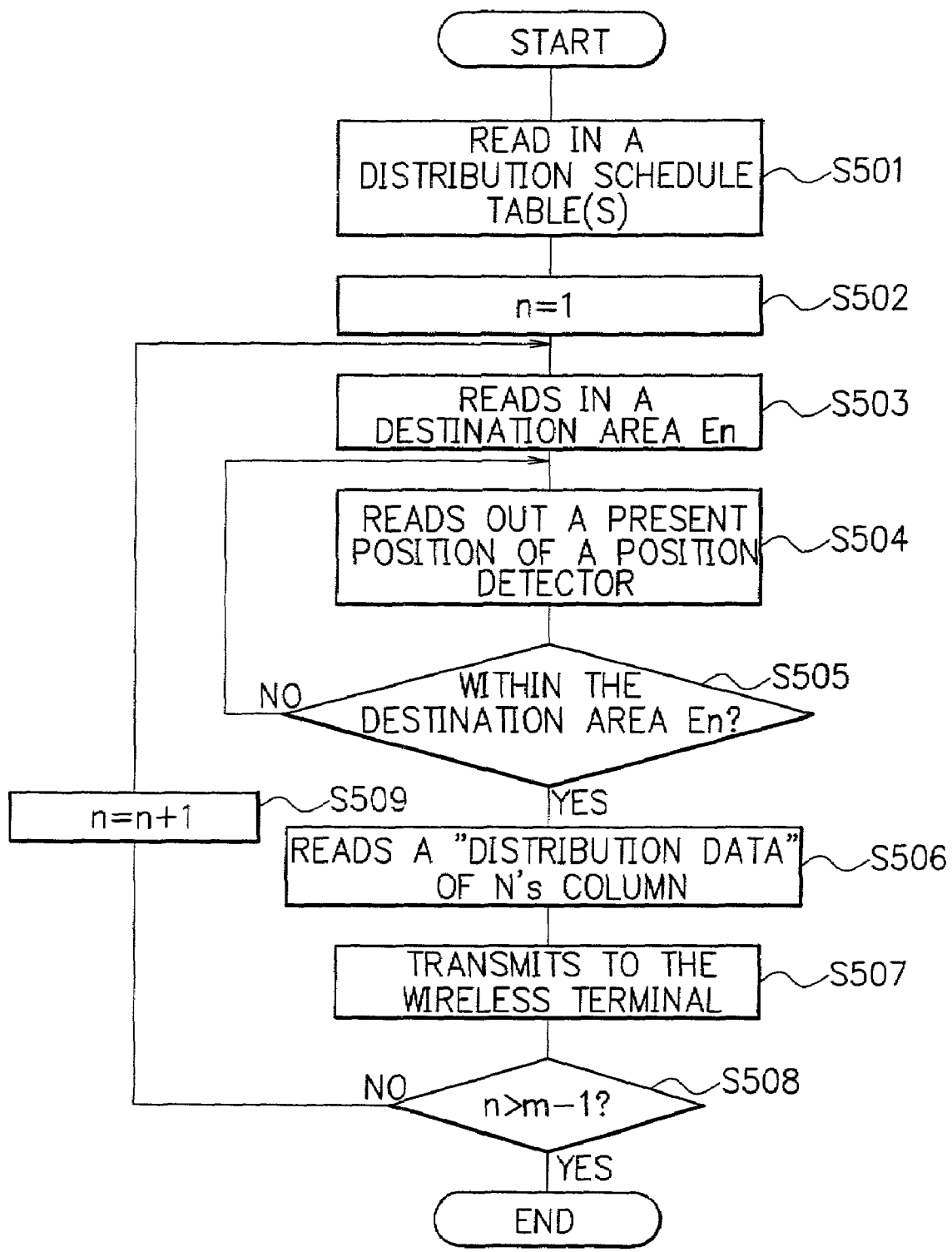
FIG. 25 is a flow chart of a distribution operation of data in the data distribution system according to the eighth modified embodiment of the present invention.

FIG. 25 shows a flow chart of a distribution operation of data in a data distribution system according to the eighth modified embodiment of the present invention. First, in the distribution center 107G, the data transmitter 158G reads in the distribution schedule table 151G shown in FIG. 24 in step S501. Then, a parameter n of the head number "#" is initialized to be set to "1" in step S502. The data transmitter 158G reads in a destination area En, that is, now, a first destination area E1 in step S503 and then reads out the present position of the wireless terminal 101, detected by a position detector (not shown) in step S504. The data transmitter 158G checks whether or not the detected present position of the wireless terminal 101 is within the destination area En in step S505. When the position of the wireless terminal 101 is beyond the destination area in step S505: NO, the operation is returned to step S504 and the position checking of the wireless terminal 101 is repeated until the position of the wireless terminal 101 comes within the destination area En. At this time, the time interval of the checking may be controlled by studying the kind of the transport means and the change of the position of the wireless terminal 101 every checking. Further, when the wireless terminal 101 is positioned far away from the destination area En, the time interval of the position checking of the wireless terminal 101 may be extended. Of course, the period of the position checking of the wireless terminal 101 is eventually determined so that it may be detected with sufficient accuracy that the present position of the wireless terminal 101 comes within the destination area En in consideration of the reference tolerance of the position of the destination.

When the present position of the wireless terminal 101 comes within the destination area En in step S505: YES, the data transmitter 158G reads the "distribution data" shown in the "storage place" column of the distribution schedule table 151G out of the database 152 in step S506, and transmits the read-out distribution data to the wireless terminal 101 of the user 102 in step S507. In this way, the data transmitter 158G carries out the read-out of the "distribution data" and the transmitting of the distribution data to the wireless terminal 101 in consideration of the reference tolerance of the position of the destination, and the user 102 can receive the necessary data for use in Toyama station in the short distance place before the user arrives at Toyama station.

The data transmitter 158G successively executes the data distribution to each user 102 in proper time sequence. Now, paying attention on a series of the data distribution operation to one user 102, the data transmitter 158G checks whether or not the value n is larger than m−1 (m is a number of heads or items) in step S508. When the value n is not larger than m−1 in step S508: NO, the data distribution work to the wireless terminal 101 of the user 102 remains. Hence, the value n is counted up by "1" in step S509 and the operation is returned to step S503 to prepare the next data distribution to the user 102. Then, the data transmitter 158G reads in a second destination area E2 in step S503. In this way, the data distribution to the user 102 is properly conducted just before arriving at each destination. The data distribution work to the user 102 is advanced in the same manner as described above, and when the value n becomes larger than m−1 in step S508: YES, the data distribution operation to the wireless terminal 101 of the user 102 is finished (END).

As described above, in the preferred embodiments of the present invention, although the kind of the distribution data is not specified in particular, however, an e-mail can be distributed to the wireless terminal, and descriptive languages such as an HTML (hypertext markup language) and the like can be also used for the data distribution to the wireless terminal. Further, for instance, only the URL as the distribution data may be distributed to the wireless terminal, and based on this the user 102 of the wireless terminal may access to the Internet to be able to view the necessary pages immediately. Furthermore, the user may access to the URL in this way, download the contents of the URL, store the downloaded contents of the URL, and view the contents of the URL later using the browser.

As described above, in a travel information distribution system according to the present invention, a schedule table containing reference places for obtaining necessary information in a traveling, arrival dates and times to the reference places and distribution data to be distributed to a wireless terminal of a user in the reference places is prepared on the basis of an itinerary table of a travel of the user, and the arrival dates and times are searched in order from the prepared schedule table to distribute distribution data to the wireless terminal of the user on respective arrival dates and times via a network. Hence, the necessary information can be distributed to the user via the network on every arrival to the reference plate. Therefore, the user carrying the wireless terminal can always receive the distribution of the updated information in the reference places, and can be available further information such as weather information, a political situation and the like. Hence, the traveler need not carry travel guidebooks and a radio set or a small television set for receiving news, and can reduce the weight of carrying bags. Further, the traveler need not any guide for historic spots and places and can realize an economical low cost travel. A distribution center for distributing distribution data such as travel information and so on can collect advertisement incomes from travel agencies and travel advertisement firms to able to make a commercial profit in business and thus can always obtain and distribute fresh information to the user. The traveler can also receive the updated and useful information. Further, the distribution data is transmitted to the traveler at a predetermined time, and the traveler can check whether or not the own travel is kept on schedule by observing the timing of the distribution data.

In a travel information distribution system of the present invention, a schedule table containing reference places for obtaining necessary information in a traveling, arrival dates and times to the reference places and distribution data to be distributed to a wireless terminal of a user in the reference places is prepared on the basis of an itinerary table of a travel of the user, and the arrival dates and times are searched in order from the prepared schedule table to distribute distribution data to the wireless terminal of the user on respective arrival dates and times via a network. Hence, the necessary information can be distributed to the user via the network on every arrival to the reference plate. Therefore, the user carrying the wireless terminal can always receive the distribution of the updated information in the reference places, and can be available further information such as weather information, a political situation and the like. Hence, the traveler need not carry travel guidebooks and a radio set or a small television set for receiving news, and can reduce the weight of carrying bags. Further, the traveler need not any guide for historic spots and places and can realize an economical low cost travel. A distribution center for distributing distribution data such as travel information and so on can collect advertisement incomes from travel agencies and travel advertisement firms to able to make a commercial profit in business and thus can always obtain and distribute fresh information to the user. The traveler can also receive the updated and useful information.

Further, in a travel information distribution system of the present invention, a time tolerance of an arrival date and time shown in a schedule table prepared by a schedule table preparator is calculated using a tolerance calculator, and an arrival date corrector corrects the arrival date and time to the earliest one on the basis of the calculated tolerance. Thus, for example, when a bus arrives one hour ahead of schedule, such a situation can be properly dealt with to conduct the distribution of the data properly. Hence, the necessary information can be utilized accurately.

A travel information distribution system of the present invention includes a schedule table preparator for preparing a schedule table for containing destination as reference places for obtaining necessary information in a traveling, position information of respective destinations and distribution data to be distributed to a wireless terminal of a user in the destinations from an itinerary table of a travel; a destination position information comparator for comparing position information detected by a position information detector with the position information of the destinations shown in the schedule table prepared by the schedule table preparatory and a data distributor for distributing distribution data related to the coincident destination to a wireless terminal via a network when the position information of any destination is coincident with the position information detected by the position information detector. Thus, the user travels to the destinations and can receive the proper distribution data in respective destinations. Hence, when the time to arrive to the destination is changed or the destination to be visited in the morning is interchanged with the destination to be visited in the afternoon, the user can receive the proper distribution data at the time when arriving at respective destinations.

In a travel information distribution system of the present invention, in addition to the aforementioned advantages, giving consideration of a tolerance of a place, in the case of a destination area, data is distributed to a user at the time when the user arrives at an edge or an entrance of the destination area and the user can always receive the necessary data without delay.

In a travel information distribution system of the present invention, a distribution data identifying information storage stores identifying information for specifying distribution data distributed by a data distributor, and the identifying information is attached with a used mark for representing a presence or absence of the use of the distribution data. The identifying information is sent to the data distributor after the finish of the travel, and the data distributor can check which identifying information has been used. Hence, a preparation of usable data and a setting of a data distribution timing can be improved.

In a travel information distribution system of the present invention, places where a user has used distribution data distributed by a data distributor are determined, and the data distributor is notified of such places after the finish of the travel. Accordingly, the using situation of the distribution data related to the places is analyzed to be able to know where the information can be effectively used and the place where the travelers need not the information as statistical values. The analyzed result can be effectively used for selection of the places for providing the information.

In a travel information distribution system of the present invention, a data distributor is notified of a present position of a wireless terminal at a predetermined time interval in order to check whether or not the wireless terminal moves on schedule with respect to the relationship between the notifying time and the notified place. Hence, tolerances with respect to a schedule written in a personal schedule table are calculated, and when the schedule is delayed or advanced, the schedule can be changed at need. As a result, the distribution of the data can be carried out at good timing in each place.

In a travel information distribution system of the present invention, a wireless terminal of a user receives a travel schedule table of the user and stores it. The user can always confirm the schedule table itself. Further, the user requests a data distributor to transmit distribution data to the wireless terminal of the user on the basis of the schedule table, and when the transmitting is not carried out for some reason, the user of the wireless terminal can make the request again. When the user of the wireless terminal changes the schedule such as moving up a part of the schedule, the user requests the data distributor to transmit the distribution data to the wireless terminal according to the changed schedule and thus can exactly obtain the distribution data at a proper timing.

In a travel information distribution system of the present invention, a wireless terminal of a user receives a travel schedule table of the user and stores it. The user checks whether or not the schedule shown in the stored schedule table is carried out on schedule with respect to the timing and the place of the data distribution. When the timing or the place of the data distribution is shifted, the user sends back the tolerance as tolerance data to the data distributor using tolerance data transmitter, and the data distributor reflects the received tolerance data to the schedule table to renew the contents of the schedule table. As a result, when a change or delay is caused in the schedule, such a change or delay is dealt with well and the distribution of the exact distribution data can be always possible.

In a travel information distribution system of the present invention, time tolerances on arriving to a destination are divided into two, and the divided two time tolerances are multiplied to predict an actual tolerance. Therefore, an accurate tolerance value can be calculated, and each tolerance for every cause can be determined exactly and readily depending on the situation of the actual moving.

In a travel information distribution system of the present invention, tolerances are calculated by considering all main factors. Thus, the tolerances can be varied by dealing with various situations, and the distribution of the distribution data can be precisely performed to meet the various situations.

In a travel information distribution system of the present invention, an e-mail can be transmitted as distribution data from a distribution center to a wireless terminal, and the information distribution can be executed by a terminal having a small display in size like a portable telephone. Further, since a load required for an information communication is small, the communication can be carried out rapidly, and the necessary information can be distributed without delay.

In a travel information distribution system of the present invention, distribution data can be distributed to a wireless terminal in the form of a file described by a descriptive language. When the wireless terminal can view the information described by the descriptive language such as a hypertext markup language like a laptop personal computer can do, the information with power of rich expression can be obtained by accessing to such information.

In a travel information distribution system of the present invention, distribution data includes addresses of contents on a network, and a wireless terminal can access to the addresses to download necessary contents. Hence, by flying from information of an information provider to a further linked information, the information desired by the user of the wireless terminal can be obtained.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A travel information distribution method comprising:
preparing a schedule table containing destinations as reference places for obtaining travel information, position information of the destinations and distribution data to be distributed to a wireless terminal of a user when the user is located in any of the reference places, from an itinerary table of a travel;
detecting position information as a present place of the wireless terminal carried in the travel;
storing, in a tolerance table, tolerances between position information of reference positions of respective destinations and position information of border positions of respective destinations included in the schedule table prepared by the preparing step;
calculating, by an area calculator, areas of respective destinations from the position information of the reference positions of respective destinations and the tolerances included in the tolerance table;
comparing the areas calculated by the area calculator with the position information of the wireless terminal detected by the detecting step;
distributing, by a data distributor, distribution data related to the destination area including the position information of the wireless terminal to the wireless terminal via a network when the position information of the wireless terminal is included in any destination area as determined by the comparing step;
storing, by the wireless terminal, identifying information for identifying the distribution data distributed by the data distributor;
specifying, by the wireless terminal one of a presence and an absence of use of the distribution data related to the identifying information stored in the distribution data identifying information storage;
notifying, by the wireless terminal, the data distributor of the distribution data specified by the specifying step after finishing of the travel; and
renewing, by the data distributor, the tolerances stored in the tolerance table based on information corresponding to the distribution data specified by the specifying step after finishing of the travel,
wherein the specifying step comprises detecting the user operating an input device provided on the wireless terminal, in which operation of the input device by the user when the distribution data is provided on a display of the wireless terminal signifies the presence of use of the distribution data, and non-operation of the input device by the user when the distribution data is provided on the display of the wireless terminal signifies the absence of use of the distribution data.

2. A travel information distribution method comprising:
preparing a schedule table containing destinations as reference places for obtaining travel information, position information of the destinations and distribution data to be distributed to a wireless terminal of a user when the user is located in any of the reference places, from an itinerary table of a travel;
detecting position information as a present place of the wireless terminal carried in the travel;
storing, in a tolerance table, tolerances between position information of reference positions of respective destinations and position information of border positions of respective destinations included in the schedule table prepared by the preparing step;
calculating, by an area calculator, areas of respective destinations from the position information of the reference positions of respective destinations and the tolerances included in the tolerance table;
comparing the areas calculated by the area calculator with the position information of the wireless terminal detected by the detecting step;
distributing, by a data distributor, distribution data related to the destination area including the position information of the wireless terminal to the wireless terminal via a network when the position information of the wireless terminal is included in any destination area as determined by the comparing step;
specifying, by the wireless terminal, the places where the user has used the distribution data distributed by the data distributor;
storing, in the wireless terminal, the places specified by the specifying step;
notifying, by the wireless terminal, the data distributor of the places stored in the storing step after finishing of the travel; and
renewing, by the data distributor, the tolerances stored in the tolerance table based on information corresponding to the places stored in the storing step after finishing of the travel,
wherein the specifying step comprises detecting the user operating an input device provided on the wireless terminal, in which operation of the input device by the user when the distribution data is provided on a display of the wireless terminal signifies the presence of use of the distribution data, and non-operation of the input device by the user when the distribution data is provided on the display of the wireless terminal signifies the absence of use of the distribution data.

3. The travel information distribution method claimed in claim 1, further comprising:
receiving, by the wireless terminal, a schedule table prepared by the scheduling step; and
requesting, by the wireless terminal, the data distributor to transmit distribution data at a distribution timing of respective distribution data on the basis of the schedule table received in the receiving step.

4. The travel information distribution method claimed in claim 1, wherein the distribution data is distributed to the wireless terminal by an e-mail.

5. The travel information distribution method claimed in claim 1, wherein the distribution data is distributed to the wireless terminal by a file described by a descriptive language.

6. The travel information distribution method claimed in claim 1, wherein the distribution data includes addresses of contents on the network, and the wireless terminal accesses to the addresses to download necessary contents.

7. A travel information distribution method comprising:
preparing a schedule table containing destinations as reference places for obtaining travel information, position information of the destinations and distribution data to be distributed to a wireless terminal of a user when the user is located in any of the reference places, from an itinerary table of a travel;
detecting, by a position information detector, position information as a present place of the wireless terminal carried in the travel;
storing, in a tolerance table, tolerances between position information of reference positions of respective destinations and position information of border positions of respective destinations included in the schedule table prepared by the Preparing step;
calculating areas of respective destinations from the position information of the reference positions of respective destinations and the tolerances included in the tolerance table;
comparing the position information detected by the position information detector with position information of destinations shown in the schedule table prepared by the preparing step, to determine if the wireless terminal is located in any of the respective destinations; and
distributing, by a data distributor, distribution data related to the coincident destination to the wireless terminal via a network when the position information of any destination included in the prepared schedule table is coincident with the position information detected in the detecting step by the comparison of the destination position information in the comparing step;
identifying, by the wireless terminal, information storage for storing identifying information for identifying the distribution data distributed by the data distributor;
specifying, by the wireless terminal, one of a presence and an absence of use of the distribution data related to the stored identifying information; and
notifying, by the wireless terminal, the data distributor of the distribution data specified by the specifying step after finishing of the travel; and
renewing, by the data distributor, the tolerances stored in the tolerance table based on the distribution data specified by the specifying step after finishing of the travel,
wherein the specifying step comprises detecting the user operating an input device provided on the wireless terminal, in which operation of the input device by the user when the distribution data is provided on a display of the wireless terminal signifies the presence of use of the distribution data, and non-operation of the input device by the user when the distribution data is provided on the display of the wireless terminal signifies the absence of use of the distribution data.

8. A travel information distribution method comprising:
preparing a schedule table containing destinations as reference places for obtaining travel information, position information of the destinations and distribution data to be distributed to a wireless terminal of a user when the user is located in any of the reference places, from an itinerary table of a travel;
detecting, by a position information detector, position information as a present place of the wireless terminal carried in the travel;
storing, in a tolerance table, tolerances between position information of reference positions of respective destinations and position information of border positions of respective destinations included in the schedule table prepared by the preparing step;
calculating areas of respective destinations from the position information of the reference positions of respective destinations and the tolerances included in the tolerance table;
comparing the position information detected by the position information detector with position information of destinations shown in the schedule table prepared by the preparing step, to determine if the wireless terminal is located in any of the respective destinations;
distributing, by a data distributor, distribution data related to the coincident destination to the wireless terminal via a network when the position information of any destination included in the prepared schedule table is coincident with the position information detected by the position information detector by the comparison of the destination position information in the comparing step;
specifying, by the wireless terminal, the places where the user has used the distribution data distributed by the data distributor;
storing, in the wireless terminal, the places specified by the specifying step;
notifying, by the wireless terminal, the data distributor of the places stored in the storing step after finishing of the travel; and
renewing, by the data distributor, the tolerances stored in the tolerance table based on the distribution data specified by the specifying step after finishing of the travel,
wherein the specifying step comprises detecting the user operating an input device provided on the wireless terminal, in which operation of the input device by the user when the distribution data is provided on a display of the wireless device signifies the presence of use of the distribution data, and non-operation of the input device by the user when the distribution data is provided on the display of the wireless device signifies the absence of use of the distribution data.

9. The travel information distribution method claimed in claim 7, further comprising:
transmitting, by a position information transmitter provided in the wireless terminal, the position information to the data distributor at a certain time interval, and
wherein the data distributor includes a personal schedule table containing times and places of the wireless terminal according to the travel schedule.

10. The travel information distribution method claimed in claim 7, further comprising:
receiving, by the wireless terminal, the schedule table prepared by the scheduling step; and
requesting, by the wireless terminal, the data distributor to transmit distribution data at a distribution timing of respective distribution data on the basis of the schedule table received by the receiving step.

11. The travel information distribution method claimed in claim 7, further comprising:
receiving, by the wireless terminal, the schedule table containing a schedule for distribution of distribution data;
storing, by the wireless terminal, the schedule table received by the receiving step; and
comparing distribution data, a distribution time and a distribution place when the distribution data is distributed with a distribution data, a distribution time and a distribution place written in the schedule table stored in the storing step.

12. The travel information distribution method claimed in claim 7, wherein the distribution data is distributed to the wireless terminal by an e-mail.

13. The travel information distribution method claimed in claim 7, wherein the distribution data is distributed to the wireless terminal by a file described by a descriptive language.

14. The travel information distribution claimed in claim 7, wherein the distribution data includes addresses of contents on the network, and the wireless terminal accesses to the addresses to download necessary contents.

15. A travel information distribution method comprising:
preparing a schedule table containing destinations as reference places for obtaining travel information, position information of the destinations and distribution data to be distributed to a wireless terminal of a user when the user is located in any of the reference places, from an itinerary table of a travel;
detecting position information as a present place of the wireless terminal carried in the travel;
storing, in a tolerance table, tolerances between position information of reference positions of respective destinations and position information of border positions of respective destinations included in the schedule table prepared by the preparing step;
calculating, by an area calculator, areas of respective destinations from the position information of the reference positions of respective destinations and the tolerances included in the tolerance table;
comparing, by a destination position information comparator, the areas calculated by the area calculator with the position information of the wireless terminal detected by the detecting step;
distributing, by a data distributor, distribution data related to the destination area including the position information of the wireless terminal to the wireless terminal via a network when the position information of the wireless terminal is included in any destination area by the comparison of the destination position information comparator;
identifying, by the wireless terminal, information storage for storing identifying information in a storage for identifying the distribution data distributed by the data distributor;
specifying, by the wireless terminal, one of a presence and an absence of use of the distribution data related to the identifying information stored in the storage; and
notifying, by the wireless terminal, the data distributor of the distribution data specified by the specifying step after finishing of the travel; and
renewing, by the data distributor, the tolerances stored in the tolerance table based on the distribution data specified by the specifying step after finishing of the travel,
wherein the specifying step comprises detecting the user operating an input device provided on the wireless terminal, in which operation of the input device by the user when the distribution data is provided on a display of the wireless device signifies the presence of use of the distribution data, and non-operation of the input device by the user when the distribution data is provided on the display of the wireless device signifies the absence of use of the distribution data.

16. A travel information distribution method comprising:
preparing a schedule table containing destinations as reference places for obtaining travel information, position information of the destinations and distribution data to be distributed to a wireless terminal of a user, when the user is located in any of the reference places, from an itinerary table of a travel;
detecting position information as a present place of the wireless terminal carried in the travel;
storing, in a tolerance table, tolerances between position information of reference positions of respective destinations and position information of border positions of respective destinations included in the schedule table prepared by the schedule preparing step;
calculating, by an area calculator, areas of respective destinations from the position information of the reference positions of respective destinations and the tolerances included in the tolerance table;
comparing, by a destination position information comparator, the areas calculated by the area calculator with the position information of the wireless terminal detected by the detecting step;
distributing, by a data distributor, distribution data related to the destination area including the position information of the wireless terminal to the wireless terminal via a network when the position information of the wireless terminal is included in any destination area by the comparison of the destination position information comparator;
specifying, by the wireless terminal, the places where the user has used the distribution data distributed by the data distributor;
storing, in the wireless terminal, the places specified by the specifying step; and
notifying, by the wireless terminal, the data distributor of the places stored in the storing step after finishing of the travel; and
renewing, by the data distributor, the tolerances stored in the tolerance table based on the distribution data specified by the specifying step after finishing of the travel,
wherein the specifying step comprises detecting the user operating an input device provided on the wireless terminal, in which operation of the input device by the user when the distribution data is provided on a display of the wireless device signifies the presence of use of the distribution data, and non-operation of the input device by the user when the distribution data is provided on the display of the wireless device signifies the absence of use of the distribution data.

17. The travel information distribution method claimed in claim 15, further comprising:
transmitting, by the wireless terminal, the position information to the data distributor at a certain time interval; and
storing, in the data distributor, a personal schedule table containing times and places of the wireless terminal according to the travel schedule.

18. The travel information distribution method claimed in claim 15, further comprising:
receiving, by the wireless terminal, the schedule table prepared by the scheduling step; and
requesting, by the wireless terminal, the data distributor to transmit distribution data at a distribution timing of respective distribution data on the basis of the schedule table received by the receiving step.

19. The travel information distribution method claimed in claim 15, wherein the distribution data is distributed to the wireless terminal by an e-mail.

20. The travel information distribution method claimed in claim 15, wherein the distribution data is distributed to the wireless terminal by a file described by a descriptive language.

21. The travel information distribution method claimed in claim 15, wherein the distribution data includes addresses of contents on the network, and the wireless terminal accesses to the addresses to download necessary contents.

22. The travel information distribution method claimed in claim 6, wherein the distribution data includes information obtained by the data distributor from the Internet by accessing addresses of contents on the Internet, and by obtaining most recent information to be provided to the wireless terminal with respect to the reference place that the user is currently supposed to be located.

23. The travel information distribution method claimed in claim 13, wherein the distribution data includes information obtained by the data distributor from the Internet by accessing addresses of contents on the Internet, and by obtaining most recent information to be provided to the wireless terminal with respect to the reference place that the user is currently supposed to be located.

24. The travel information distribution method claimed in claim 19, wherein the distribution data provided to the wireless terminal by the e-mail includes information obtained by the data distributor from the Internet by accessing addresses of contents on the Internet, and by obtaining most recent information to be provided to the wireless terminal with respect to the reference place that the user is currently supposed to be located.

* * * * *